US012549905B2

(12) United States Patent
Fu et al.

(10) Patent No.: US 12,549,905 B2
(45) Date of Patent: Feb. 10, 2026

(54) SPEAKERS

(71) Applicant: SHENZHEN SHOKZ CO., LTD., Guangdong (CN)

(72) Inventors: Junjiang Fu, Shenzhen (CN); Lei Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 261 days.

(21) Appl. No.: 18/164,681

(22) Filed: Feb. 6, 2023

(65) Prior Publication Data

US 2023/0179925 A1 Jun. 8, 2023

Related U.S. Application Data

(63) Continuation of application No. PCT/CN2021/125855, filed on Oct. 22, 2021.

(51) Int. Cl.
*H04R 25/00* (2006.01)
*G10K 11/172* (2006.01)
(Continued)

(52) U.S. Cl.
CPC ............ *H04R 9/06* (2013.01); *G10K 11/172* (2013.01); *H04R 1/1066* (2013.01);
(Continued)

(58) Field of Classification Search
CPC .... G10K 11/04; G10K 11/172; G10K 11/178; H04R 1/1075; H04R 2460/13; H04R 1/10; H04R 1/1066; H04R 1/2803; H04R 1/283; H04R 1/2834; H04R 1/2869; H04R 2400/03; H04R 9/025; H04R 9/046;
(Continued)

(56) References Cited

U.S. PATENT DOCUMENTS

2003/0012395 A1 1/2003 Fukuda
2010/0054501 A1 3/2010 Choi
(Continued)

FOREIGN PATENT DOCUMENTS

CN 101478499 B 12/2011
CN 105101019 A 11/2015
(Continued)

OTHER PUBLICATIONS

KR1020090082999A. Bone conduction speaker of double frame and double magnet structures (0908). Retrieved from https://dialog.proquest.com/professional/docview/1409158836?accountid=131444. Translation (Year: 2009).*
(Continued)

*Primary Examiner* — Phylesha Dabney
(74) *Attorney, Agent, or Firm* — METIS IP LLC

(57) ABSTRACT

The embodiments of the present disclosure provide a speaker. The speaker may include a vibration assembly and a first elastic element. The vibration assembly may include a vibration element and a vibration housing. The vibration element may convert an electrical signal into a mechanical vibration. The vibration housing may be in contact with facial skin of a user. The first elastic element may be elastically connected to the vibration housing.

16 Claims, 10 Drawing Sheets

(51) Int. Cl.

| | |
|---|---|
| ***H04R 1/10*** | (2006.01) |
| ***H04R 1/28*** | (2006.01) |
| ***H04R 9/02*** | (2006.01) |
| ***H04R 9/06*** | (2006.01) |

(52) U.S. Cl.
CPC ......... *H04R 1/1075* (2013.01); *H04R 1/2803* (2013.01); *H04R 1/283* (2013.01); *H04R 9/025* (2013.01); *H04R 2460/13* (2013.01)

(58) Field of Classification Search
CPC ........ H04R 9/06; H04R 25/55; H04R 25/606; H04R 9/02
USPC .......................................................... 381/150
See application file for complete search history.

(56) References Cited

U.S. PATENT DOCUMENTS

| | | | |
|---|---|---|---|
| 2010/0316235 | A1 | 12/2010 | Park et al. |
| 2015/0030188 | A1 | 1/2015 | Nabata et al. |
| 2017/0111728 | A1 | 4/2017 | Kim et al. |
| 2018/0255401 | A1 | 9/2018 | Asfaw et al. |
| 2019/0057680 | A1 | 2/2019 | Morozov |
| 2019/0082266 | A1 | 3/2019 | Qi et al. |
| 2020/0213780 | A1 | 7/2020 | Qi et al. |
| 2020/0296526 | A1 | 9/2020 | Kim et al. |
| 2020/0336824 | A1 | 10/2020 | Zheng et al. |
| 2021/0092525 | A1 | 3/2021 | Zheng et al. |

FOREIGN PATENT DOCUMENTS

| | | | |
|---|---|---|---|
| CN | 204741559 | U | 11/2015 |
| CN | 204929243 | U | 12/2015 |
| CN | 205454090 | U | 8/2016 |
| CN | 107889036 | A | 4/2018 |
| CN | 108243377 | A | 7/2018 |
| CN | 108632726 | A | 10/2018 |
| CN | 208434106 | U | 1/2019 |
| CN | 106658309 | B | 8/2019 |
| CN | 210868165 | U | 6/2020 |
| CN | 114765715 | A | 7/2022 |
| EP | 3337185 | A1 | 6/2018 |
| JP | 2017183859 | A | 10/2017 |
| KR | 20090082999 | A | 8/2009 |
| KR | 20120014294 | A | 2/2012 |
| WO | 2019003465 | A1 | 1/2019 |
| WO | 2019237726 | A1 | 12/2019 |
| WO | 2019237727 | A1 | 12/2019 |

OTHER PUBLICATIONS

International Search Report in PCT/CN2021/125855 mailed on Jan. 19, 2022, 7 pages.
Written Opinion in PCT/CN2021/125855 mailed on Jan. 19, 2022, 5 pages.
International Search Report in PCT/CN2021/071875 mailed on Oct. 20, 2021, 8 pages.
Written Opinion in PCT/CN2021/071875 mailed on Oct. 20, 2021, 5 pages.
Notice of Reasons for Rejection in Japanese Application No. 2023518840 mailed on May 27, 2024, 10 pages.
Office Action in Russian Application No. 2023103339 mailed on Jun. 15, 2023, 18 pages.
Decision to Grant a Patent in Japanese Application No. 2023-518840 mailed on Feb. 4, 2025, 6 pages.

* cited by examiner

SPEAKERS

CROSS-REFERENCE TO RELATED DISCLOSURES

This application is a Continuation of International Application No. PCT/CN2021/125855 filed on Oct. 22, 2021, which claims priority of International Patent Application No. PCT/CN2021/071875, filed on Jan. 14, 2021, the contents of each of which are incorporated herein by reference.

TECHNICAL FIELD

The present disclosure generally relates to the audio output technical field, and in particular to speakers.

BACKGROUND

Speakers capable of conducting sound through bones can convert sound signals into mechanical vibration signals, and transmit the mechanical vibration signals to auditory nerves of human body through human tissue and bones, so that a wearer can hear sound.

The present disclosure provides speakers that may reduce a vibration amplitude at a specific frequency, thereby reducing a low frequency vibration sense of the speakers, weakening a sound leakage when the speakers are working, and improving the sound quality of the speakers.

SUMMARY

The present disclosure provides a speaker to reduce a vibration amplitude of a vibration housing in contact with a face of a user during the use of the speaker, thereby weakening a low frequency vibration sense, reducing a sound leakage of the speaker, and improving the sound quality.

In order to achieve the above-mentioned function, technical schemes provided by the present disclosure are as follows:

A speaker may include a vibration assembly and a first elastic element. The vibration assembly may include a vibration element and a vibration housing. The vibration element may convert an electrical signal into a mechanical vibration. The vibration housing may be in contact with facial skin of a user. The first elastic element may be elastically connected to the vibration housing.

In some embodiments, the speaker may further include a mass element connected to the vibration housing through the first elastic element. The mass element may be connected to the first elastic element to form a resonance assembly.

In some embodiments, the vibration housing may include a vibration plate in contact with the facial skin of the user. The first elastic element may be elastically connected to the vibration plate.

In some embodiments, the mass element may be a groove member. The vibration element may be at least partially accommodated in the groove member. The first elastic element may be connected to the vibration plate and an inner wall of the groove member.

In some embodiments, the first elastic element may be a vibration transmission sheet.

In some embodiments, a mass ratio of the mass element to the vibration plate may be in a range of 0.04-1.25.

In some embodiments, the mass ratio of the mass element to the vibration plate may be in a range of 0.1-0.6.

In some embodiments, the vibration assembly may form a first resonance peak at a first frequency. The resonance assembly may form a second resonance peak at a second frequency. A ratio of the second frequency to the first frequency may be in a range of 0.5-2.

In some embodiments, the vibration assembly may form the first resonance peak at the first frequency. The resonance assembly may form the second resonance peak at the second frequency. The ratio of the second frequency to the first frequency may be in a range of 0.9-1.1.

In some embodiments, the first frequency and the second frequency may be less than 500 Hz.

In some embodiments, in a frequency range less than the first frequency, a vibration amplitude of the resonance assembly may be greater than a vibration amplitude of the vibration housing.

In some embodiments, the vibration housing may include a vibration plate and a back plate arranged opposite to the vibration plate. The vibration plate may be in contact with the facial skin of the user. The mass element may be connected to the back plate through the first elastic element. The first elastic element may be arranged on a surface of the back plate. A contact area between the first elastic element and the back plate may be greater than 10 $mm^2$.

In some embodiments, the first elastic element may include at least one of silica gel, plastic, glue, foam, or spring.

In some embodiments, the first elastic element may be the glue.

In some embodiments, a shore hardness of the glue may be in a range of 30-50.

In some embodiments, a tensile strength of the glue may not be less than 1 MPa.

In some embodiments, an elongation at break of the glue may be in a range of 100%-500%.

In some embodiments, a bonding strength between the glue and the back plate may be in a range of 8 MPa-14 MPa.

In some embodiments, a thickness of a glue layer formed by coating the glue on the surface of the back plate may be in a range of 50 μm-150 μm.

In some embodiments, a contact area of the glue and the back plate may account for 1%-98% of an area of an inner wall of the back plate.

In some embodiments, the contact area of the glue and the back plate may be in a range of 100 $mm^2$-200 $mm^2$.

In some embodiments, the contact area between the glue and the back plate may be 150 $mm^2$.

In some embodiments, a hole may be provided on at least one of an interior or a surface of the first elastic element.

In some embodiments, the hole may be filled with a damping filler.

In some embodiments, the first elastic element may be the foam.

In some embodiments, a thickness of the foam may be in a range of 0.6 mm-1.8 mm.

In some embodiments, a mass ratio of the mass element to the vibration plate and the back plate may be in a range of 0.04-1.25.

In some embodiments, the mass ratio of the mass element to the vibration plate and the back plate may be in a range of 0.1-0.6.

In some embodiments, a material of the mass element may include at least one of plastic, metal, or a composite material.

In some embodiments, the speaker may include at least two resonance assemblies. In each of the at least two resonance assemblies, the first elastic element may be connected to the back plate. Two adjacent resonance assemblies of the at least two resonance assemblies may be separated by a preset distance.

In some embodiments, the speaker may include at least two resonance assemblies stacked along a thickness direction of first elastic elements in the at least two resonance assemblies. The first elastic element of one of two adjacent resonance assemblies of the at least two resonance assemblies may be connected to a mass element of the other of the two adjacent resonance assemblies of the at least two resonance assemblies.

In some embodiments, the first elastic element may be arranged on an inner wall of the back plate.

In some embodiments, the first elastic element may include a diaphragm. The mass element may include a composite structure attached to a surface of the diaphragm.

In some embodiments, the composite structure may include at least one of a paper cone, an aluminum sheet, or a copper sheet.

In some embodiments, the vibration housing may be provided with a sound outlet. A sound generated by a vibration of the resonance assembly may be guided to outside through the sound outlet.

In some embodiments, the sound outlet may be arranged on the back plate.

In some embodiments, the first elastic element may be arranged on an outer wall of the back plate.

In some embodiments, the mass element may be a groove member. The vibration element may be at least partially accommodated in the groove member. The first elastic element may be connected to an outer wall of the vibration housing and an inner wall of the groove member. A sound channel may be formed between the inner wall of the groove member and the outer wall of the vibration housing.

In some embodiments, the speaker further may include a function element connected to the mass element.

In some embodiments, the function element may include a battery and a printed circuit board.

In some embodiments, the vibration assembly may further include a second elastic element. The vibration element may transmit the mechanical vibration to the vibration housing through the second elastic element.

In some embodiments, the second elastic element may be a vibration transmission sheet fixedly connected to the vibration housing.

BRIEF DESCRIPTION OF THE DRAWINGS

The present disclosure may be further illustrated by way of exemplary embodiments, which may be described in detail with the accompanying drawings. These embodiments are not limiting, and in these embodiments, the same number indicates a similar structure, wherein.

DETAILED DESCRIPTION

Figure 1:
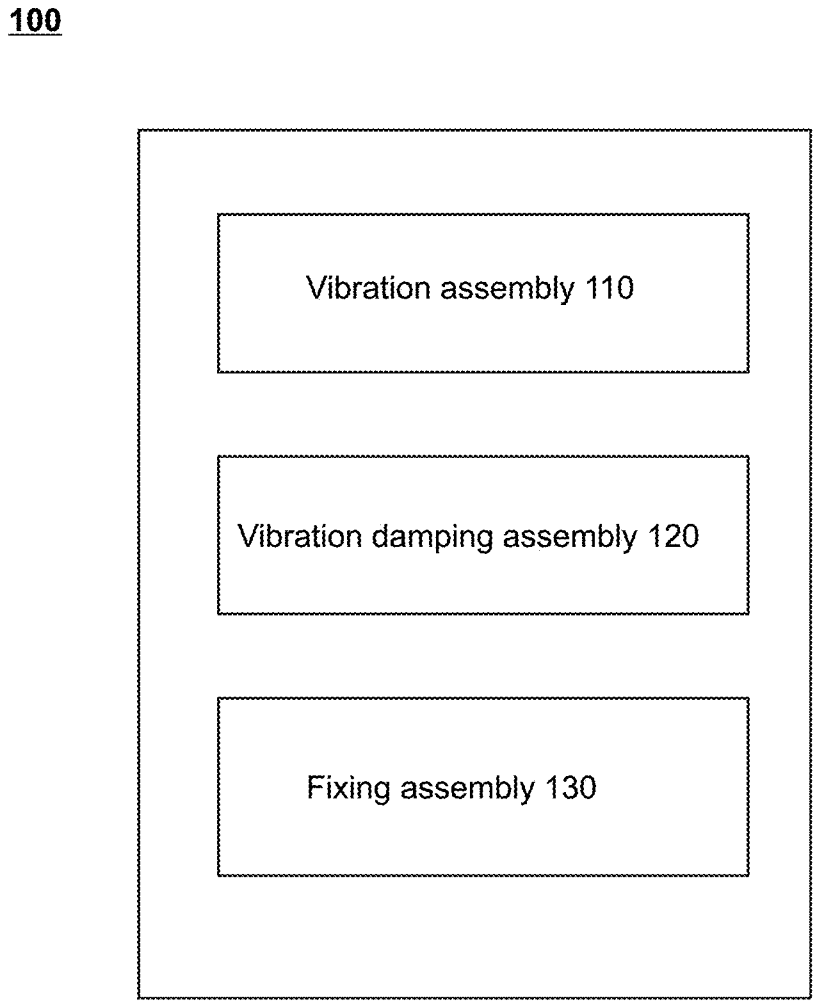
FIG. 1 is a schematic diagram illustrating a speaker according to some embodiments of the present disclosure.

In order to more clearly illustrate the technical solutions of the embodiments of the present disclosure, the following may briefly introduce the drawings that need to be used in the description of the embodiments. Obviously, the drawings in the following description are only some examples or embodiments of the present disclosure. For those of ordinary skill in the art, without creative work, the present disclosure can be applied to other similar scenarios according to these drawings. It should be understood that these exemplary embodiments are given only to enable those skilled in the relevant art to better understand and realize the present invention, but not to limit the scope of the present disclosure in any way. Unless it is obvious from the language environment or otherwise stated, the same reference numbers in the drawings represent the same structure or operation.

As used in the present disclosure and the appended claims, the singular forms "a," "an," and "the" include plural referents unless the content clearly dictates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may further include other steps or elements. The term "one embodiment," means "at least one embodiment,". The term "another embodiment," means "at least one further embodiment,". Relevant definitions of other terms may be given in the description below. Hereinafter, without loss of generality, when describing related technologies of bone conduction in the present invention, the description of "bone conduction speaker," or "bone conduction earphone," may be used. This description is only a form of bone conduction application. For those of ordinary skill in this field, "speaker," or "earphone," may further be replaced by other similar words, such as "player," "hearing aid," etc.

Some embodiments of the present disclosure provide a speaker with a function of bone conduction. The speaker may be provided with a vibration damping assembly, which may reduce a mechanical vibration intensity generated by the speaker during operation. The mechanical vibration may refer to a vibration generated by a vibration housing (e.g., a vibration plate in contact with facial skin of a user, and a side plate, a back plate, etc. connected to the vibration plate) of the speaker. In some cases, the vibration damping assembly is used to weaken mechanical vibrations of the vibration housing in a low frequency band, which may reduce a vibration sense of the vibration housing in the low frequency band, so that the user is more comfortable when wearing the speaker. In other cases, when a vibration intensity of the vibration housing decreases, a sound leakage caused by the vibration of the vibration housing may be reduced, which may effectively improve the sound quality of the speaker and user experience. The speaker in the present disclosure may refer to a speaker that uses bone conduction as one of the main ways to transmit sound. For example, when the speaker is working, the vibration housing of the speaker may vibrate mechanically. The vibration housing may transmit the mechanical vibrations to the user's auditory nerve through the facial skin of the user by bone conduction, so that the user can hear sound. For the convenience of description, in one or more embodiments of the present disclosure, a speaker may be used as an example for description. It should be noted that the way of transmitting sound through bones is not the only way for the speaker in the present disclosure to transmit sound to the user. In some embodiments, the speaker may transmit sound in other ways as well. For example, the speaker may further include an air conduction speaker assembly, that is, the speaker may include a bone conduction speaker assembly and an air conduction speaker assembly, and transmit sound to the user by the combination of the bone conduction and the air conduction. The air conduction speaker assembly may transmit vibration waves to the user's auditory nerve through air, so that the user can hear sound.

FIG. 1 is a schematic diagram illustrating a speaker according to some embodiments of the present disclosure. As shown in FIG. 1, the speaker 100 may include a vibration assembly 110, a vibration damping assembly 120, and a fixing assembly 130.

The vibration assembly 110 may generate mechanical vibrations. The generation of the mechanical vibrations is accompanied by energy conversion. The speaker 100 may use the vibration assembly 110 to realize the conversion of signals containing sound information into mechanical vibrations. A process of the conversion may include coexistence and conversion of many different types of energy. For example, electrical signals may be directly converted into mechanical vibrations through a transducer in the vibration assembly 110. As another example, sound information may be included in light signals, and a specific transducer may realize a process of converting the light signals into vibration signals. Other types of energy that may coexist and be converted during the working process of the transducer may include thermal energy, magnetic field energy, or the like. The energy conversion ways of the transducer may include moving coil, electrostatic, piezoelectric, moving iron, pneumatic, electromagnetic, or the like. The vibration assembly may transmit the generated mechanical vibrations to the user's eardrum through facial skin of the user in a way of bone conduction, so that the user can hear sound.

In some embodiments, the vibration assembly 110 may include a vibration element (e.g., a vibration element 211) and a vibration housing (e.g., a vibration housing 213) connected to the vibration element. The vibration element may generate mechanical vibrations that may be transmitted to the vibration housing. The vibration housing may be in contact with the facial skin of a user and transmit the mechanical vibrations to the user's auditory nerves.

In some embodiments, the vibration element (also referred to as a transducer) may include a magnetic circuit assembly. The magnetic circuit assembly may provide magnetic fields. The magnetic fields may be configured to convert signals containing sound information into mechanical vibration signals. In some embodiments, the sound information may include video and audio files in a specific data format, or data or files that may be converted into sound through a specific way. The signals containing sound information may come from a storage assembly of the speaker 100, or from an information generation, storage, or transmission system other than the speaker 100. The signals containing sound information may include one or a combination of electrical signals, optical signals, magnetic signals, mechanical signals, or the like. The signals containing sound information may come from one source or a plurality of sources. The plurality of signal sources may be correlated or uncorrelated. In some embodiments, the speaker 100 may acquire the signals containing sound information in a variety of different ways. The acquisition of the signal may be wired or wireless, and may be real-time or delayed. For example, the speaker 100 may receive electrical signals containing sound information through wired or wireless means, or may directly obtain data from a storage medium to generate sound signals. As another example, the speaker 100 may include a assembly with a sound collection function. The assembly may pick up sound in the environment, convert mechanical vibrations of the sound into electrical signals, and obtain the electrical signals meeting a specific requirement after being processed by an amplifier. In some embodiments, a wired connection may include a metallic cable, an optical cable, or a mix of metallic and optical cables. For example, the wired connection may include one or a combination of a coaxial cable, a communication cable, a flexible cable, a spiral cable, a non-metallic sheathed cable, a metal sheathed cable, a multi-core cable, a twisted pair cable, a ribbon cable, a shielded cable, a telecommunication cable, a twin-strand cable, a parallel twin core wire, a twisted pair, or the like. The examples described above are only used for the convenience of description, and a medium of the wired connection may further include types, for example, other transmission carriers of electrical signals or optical signals.

The wireless connection may include radio communication, free space optical communication, acoustic communication, electromagnetic induction, or the like. The radio communication may include IEEE802.11 series standard, IEEE802.15 (e.g., FDMA,TDMA,SDMA,CDMA, and SSMA) series standard, first-generation mobile communication technology, second-generation mobile communication technology, general packet radio service technology, third-generation (e.g.,CDMA2000, WCDMA, TD-SCDMA, and WiMAX) mobile communication technology, fourth-generation (e.g., TD-LTE and FDD-LTE) mobile communication technology, satellite communication (e.g., GPS technology), near field communication (NFC), and other technologies operating in the ISM frequency band (such as 2.4 GHz, etc.). The free space optical communication may include visible light, infrared signals, etc. The electromagnetic induction may include a near-field communication technology, etc. The examples described above are only used for the convenience of illustration, and a medium of the wireless connection may further include other types, for example, Z-wave technology, other charged civilian radio frequency bands and military radio frequency bands, etc. For example, as an application scene of the wireless connection, the speaker 100 may obtain the signals containing sound information from other devices through Bluetooth technology.

Figure 2:
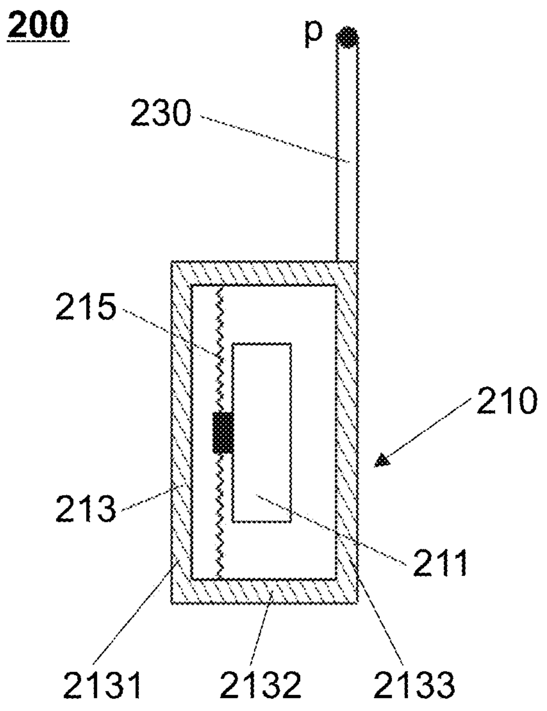
FIG. 2 is a schematic diagram illustrating a longitudinal section of a speaker without a vibration damping assembly according to some embodiments of the present disclosure.

In some embodiments, the vibration housing may form a closed or non-closed accommodation space, and the vibration element may be arranged inside the vibration housing. In some embodiments, the vibration housing may include a vibration plate and a side plate and a back plate that are connected to the vibration plate. For example, as shown in FIG. 2, a vibration plate 2131, a side plate 2132 and a back plate 2133 may form an accommodation space, and the vibration element 211 may be arranged in the accommodation space. In some embodiments, the side plate 2132 and the back plate 2133 may be separate assemblies. The side plate 2132 and the back plate 2133 may be physically connected or connected and fixed through other connection structures. For example, the side plate 2132 and the back plate 2133 may be separately formed plate-shaped members, and then connected together by bonding. In some embodiments, the side plate 2132 and the back plate 2133 may be different parts of the same structure, that is, there is no partitioned connecting surface between the side plate 2132 and the back plate 2133. For example, the vibration housing 213 may include a hemispherical housing or a semi-ellipsoidal housing and the vibration plate 2131 connected to the vibration housing 213. The hemispherical housing or the semi-ellipsoidal housing may include the side plate 2132 and the back plate 2133, and the side plate 2132 and the back plate 2133 may have no obvious boundary. For example, a part of the vibration housing 213 connected to the vibration plate 2131 may be the side plate 2132, while the rest part of the vibration housing 213 may be the back plate 2133.

The vibration plate 2131 may refer to a structure in contact with facial skin of a user. The vibration plate 2131 may be connected to the vibration element 211, and the mechanical vibrations generated by the vibration element 211 may be transmitted to the user through the vibration plate 2131. The speaker in the present disclosure may mainly transmit sound through bone conduction, by which mechanical vibrations may be transmitted to the user through a part (e.g., the vibration plate 2131) that is in contact with the user's body (e.g., the facial skin of the user), and further be transmitted to the user's auditory nerve through the user's skin and bones to allow the user to hear sound. In some embodiments, a contact area of the vibration plate 2131 with the facial skin of the user may be at least larger than a preset contact area. In some embodiments, the preset contact area may be in a range of 50 $mm^2$-1000 $mm^2$. In some embodiments, the preset contact area may be in a range of 75 $mm^2$-850 $mm^2$. In some embodiments, the preset contact area may be in a range of 100 $mm^2$-700 $mm^2$.

In some embodiments, the vibration housing may not constitute the accommodation space. In some embodiments, the vibration housing may only include the vibration plate in contact with the face of the user, and not include the side plate or the back plate. For example, in the embodiments shown in FIG. 10 and FIG. 11, a vibration housing 1013 may be a plate-like structure, and be directly connected to a vibration element 1011, and be in contact with the facial skin of the user. Therefore, in the embodiments, the vibrating housing 1013 may be equivalent to the vibration plate.

In some embodiments, the vibration plate (e.g., the vibration plate 2131 shown in FIG. 2) may be in direct contact with the facial skin of the user. In some embodiments, an outer side of the vibration plate of the speaker 100 may be wrapped with a vibration transmission layer. The vibration transmission layer may be in contact with the facial skin of the user. A vibration system formed by the vibration plate and the vibration transmission layer may transmit generated sound vibrations to the facial skin of the user through the vibration transmission layer. In some embodiments, the outer side of the vibration plate may be wrapped with one vibration transmission layer. In some embodiments, the outer side of the vibration plate may be wrapped with a plurality of vibration transmission layers. In some embodiments, the vibration transmission layer may be made of one or more materials. The materials of different vibration transmission layers may be the same or different. In some embodiments, the plurality of vibration transmission layers may be stacked in a thickness direction of the vibration plate, or spread out in a horizontal direction of the vibration plate, or a combination of the above two arrangements. An area of the vibration transmission layer may be set to various sizes. In some embodiments, the area of the vibration transmission layer may not be less than 1 $cm^2$. In some embodiments, the area of the vibration transmission layer may not be less than 2 $cm^2$. In some embodiments, the area of the vibration transmission layer may not be less than 6 $cm^2$.

In some embodiments, the vibration transmission layer may be made of materials with certain adsorption, flexibility, and chemical properties, for example, plastics (may include, but is not limited to high molecular polyethylene, blown nylon, engineering plastics, etc.), rubber, or other single or composite materials that may achieve the same performance. The types of the rubber may include, but are not limited to general-purpose rubber and special-purpose rubber. The general-purpose rubber may include, but is not limited to, natural rubber, isoprene rubber, styrene-butadiene rubber, butadiene rubber, neoprene, or the like. The special-purpose rubber may include, but is not limited to nitrile rubber, silicone rubber, fluorine rubber, polysulfide rubber, polyurethane rubber, epichlorohydrin rubber, acrylate rubber, propylene oxide rubber, or the like. The styrene-butadiene rubber may include, but is not limited to emulsion polymerized styrene-butadiene rubber and solution-polymerized styrene-butadiene rubber. The composite material may include, but is not limited to reinforcement materials such as glass fiber, carbon fiber, boron fiber, graphite fiber, fiber, graphene fiber, silicon carbide fiber, or aramid fiber. The composite material may be a compound of other organic and/or inorganic materials, for example, glass fiber reinforced unsaturated polyester, epoxy resin or phenolic resin matrix composed of various types of FRP. Other materials that may be used to make the vibration transmission layer may include one or a combination of silica gel, polyurethane, and polycarbonate.

In some embodiments, the vibration element may be connected to any position of the vibration housing. For example, in the embodiments shown in FIG. 12, a vibration element 1211 may be directly connected to a vibration plate 12131. As another example, in the embodiments shown in FIG. 4, a vibration element 411 may be connected to a side plate 4132. Mechanical vibrations generated by the vibration element 411 may be first transmitted to the side plate 4132, and then transmitted to a vibration plate 4131, and finally transmitted to the user through the vibration plate 4131.

The vibration damping assembly 120 may be connected to the vibration housing (e.g., a vibration housing 413 shown in FIG. 4) to reduce a mechanical vibration intensity of the vibration housing. In some embodiments, the vibration damping assembly 120 may be directly connected to the vibration plate of the vibration housing. For example, in the embodiments shown in FIG. 10, a vibration damping assembly 1020 (a first elastic element 1021 of the vibration damping assembly 1020) may be connected to the vibration plate 12131. In some embodiments, the vibration damping assembly 120 may be connected to other assemblies of the vibration housing. For example, in the embodiments shown in FIG. 4, a vibration damping assembly 420 may be connected to a back plate 4133 of the vibration housing 413.

Figure 4:
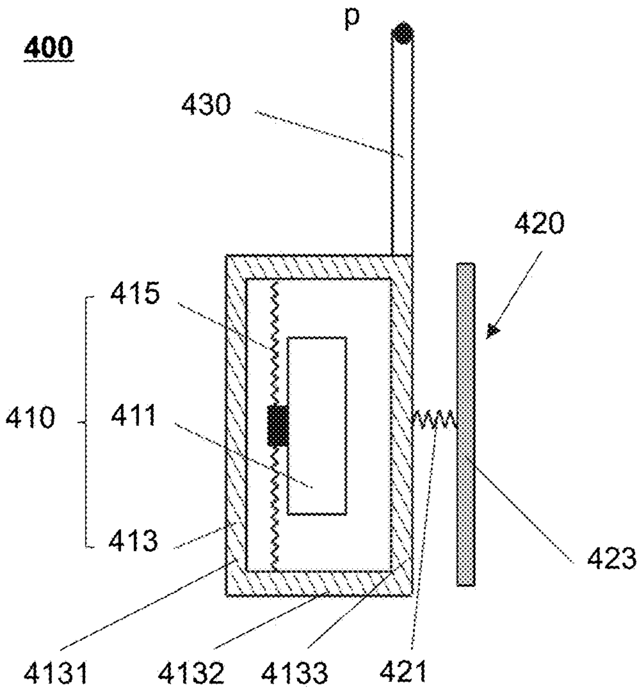
FIG. 4 is a schematic diagram illustrating a longitudinal section of a speaker with a vibration damping assembly according to some embodiments of the present disclosure.

In some embodiments, the vibration damping assembly 120 may include a first elastic element (e.g., a first elastic element 421 shown in FIG. 4). In some embodiments, the first elastic element may have a certain damping. In some cases, when the vibration housing vibrates, the first elastic element connected to the vibration housing may absorb the mechanical energy of the vibration housing to reduce a vibration amplitude of the vibration housing. In some embodiments, the damping of the first elastic element may be in a range of 0.005 N.s/m-0.5 N.s/m. In some embodiments, the damping of the first elastic element may be in a range of 0.0075 N.s/m-0.4 N.s/m. In some embodiments, the damping of the first elastic element may be in a range of 0.01 N.s/m-0.3 N.s/m.

In some embodiments, the damping assembly 120 may include a first elastic element (e.g., the first elastic element 421 shown in FIG. 4) and a mass element connected to the first elastic element (e.g., a mass element 423 shown in FIG. 4). The mass element may form a resonance assembly with the first elastic element. The mechanical energy of the vibration housing may be transmitted to the mass element through the first elastic element to cause the mass element to vibrate to absorb the mechanical energy of the vibration housing to reduce a vibration intensity of the vibration housing. More descriptions regarding the vibration damping assembly may be found in other embodiments of the present disclosure (e.g., the embodiments shown in FIG. 4).

As described in the foregoing embodiments, the entirety of the mass element and the first elastic element may be the resonance assembly. In some embodiments, the vibration damping assembly 120 may include one or more resonance assemblies. In some embodiments, a count of the resonance assemblies may be one. For example, in the embodiments shown in FIG. 4, the vibration damping assembly 420 may include only one resonance assembly, and the first elastic element 421 may be connected to an outer wall of the back plate 4133 of the vibration housing 413. In other embodiments, the count of resonance assemblies may be at least two. For example, in the embodiments shown in FIG. 16, a vibration damping assembly 1620 may include two resonance assemblies arranged on an inner wall of a back plate 16133.

In some embodiments, when a plurality of resonance assemblies are provided in the speaker 100, factors such as setting positions of the resonance assemblies, connection manners of the resonance assemblies, and resonance frequencies of the resonance assemblies may have an influence on the vibration reduction effect of the vibration damping assembly 120.

In some embodiments, at least two resonance assemblies may be arranged inside and/or outside the vibration housing. For example, the at least two resonance assemblies may be arranged in the vibration housing. For example, in the embodiments shown in FIG. 16, the two resonance assemblies may be connected to the inner wall of the back plate 16133. As another example, at least two resonance assemblies may be arranged outside the vibration housing. As a further example, at least two resonance assemblies may be arranged inside and outside the vibration housing, respectively. For example, a portion of the at least two resonance assemblies may be arranged outside the vibration housing, and the first elastic elements of the portion may be connected to the outer wall of the back plate; the other portion of the at least two resonance assemblies may be arranged in the vibration housing, and the first elastic elements of the other portion may be connected to the inner wall of the back plate.

In some embodiments, the at least two resonance assemblies may be directly connected to the inner wall or the outer wall of the vibration housing. For example, the at least two resonance assemblies may be directly connected to the inner wall of the vibration housing by bonding, welding, integral molding, riveting, screwing, or the like. For example, in the embodiments shown in FIG. 16, the first elastic elements (e.g., a first elastic element 1621-1 and a first elastic element 1621-2) of the two resonance assemblies may be directly connected to the inner wall of the back plate 16133. As another example, at least one of the at least two resonance assemblies may be connected to other resonance assemblies instead of being directly connected to the inner wall of the vibration housing. For example, in the embodiments shown in FIG. 17, there are two resonance assemblies (including a first resonance assembly 1720-1 and a second resonance assembly 1720-2), the first resonance assembly 1720-1 may be directly connected to the inner wall of a back plate 17133 (a first elastic element 1721-1 is connected to the inner wall of the back plate 17133). A first elastic element 1721-2 of the second resonance assembly 1720-2 may be arranged on the first resonance assembly 1720-1 along a thickness direction of the first elastic assembly 1721-1 of the first resonance assembly 1720-1. The first elastic element 1721-2 may be connected to a mass element 1723-1 of the first resonance assembly 1720-1.

In some embodiments, when at least two resonance assemblies are arranged on the inner wall or the outer wall of the vibration housing, two adjacent resonance assemblies may be separated by a preset distance. For example, in the embodiments shown in FIG. 16, the vibration damping assembly 1620 may include two resonance assemblies (e.g., a first resonance assembly 1620-1 and a second resonance assembly 1620-2), and first elastic elements (e.g., a first elastic element 1621-1 and a first elastic element 1621-2) of the two resonance assemblies may be directly connected to the inner wall of the back plate 16133, and edges of the two first elastic elements may be separated by a preset distance. In some embodiments, the preset distance may be in a range of 0.1 mm-70 mm. In some embodiments, the preset distance may be in a range of 0.2 mm-60 mm. In some embodiments, the preset distance may be in a range of 0.3 mm-50 mm. In some embodiments, the resonance assembly may include a positioning member, which may be fixedly arranged on the vibration housing to position the first elastic element to accurately install the first elastic element on the vibration housing. For example, the positioning member may be a plastic surrounding edge arranged on the vibration housing, and the plastic surrounding edge may position edges of the first elastic element.

In some embodiments, the at least two resonance assemblies may be the same or similar. The same or similar resonance assemblies may refer to the same or similar mass units, the same or similar first elastic elements, and the same or similar resonance frequencies of the resonance assemblies. In other embodiments, the at least two resonance assemblies may be different. For example, in the embodiments shown in FIG. 16, dimensions of the first elastic elements and the mass elements of the two resonance assemblies may be obviously different.

In some embodiments, the resonance frequencies of the at least two resonance assemblies may be different. In some cases, when the resonance frequencies of the at least two resonance assemblies are different, each of the at least two resonance assemblies may produce a vibration damping effect in a frequency band near its resonance frequency. For example, on the basis of the embodiments shown in FIG. 4, the vibration damping assembly 420 may further include another resonance assembly (including a mass element and a first elastic element), which has a resonance frequency at about 300 Hz. The resonance assembly may effectively absorb the mechanical energy of the vibration housing 413 within a range of 250 Hz-350 Hz. The resonance frequency of the original resonance assembly (i.e., the resonance assembly formed by the mass element 423 and the first elastic element 421) may be the second frequency "f0", which may effectively absorb the mechanical energy of the vibration housing 413 in a low frequency range (e.g., 100 Hz-200 Hz). Therefore, the two resonance assemblies of the vibration damping assembly 420 may absorb the mechanical energy of the vibration housing 413 in two frequency bands, thereby effectively widening the frequency band in which the vibration damping assembly 420 absorbs vibration.

In some other embodiments, the resonance frequencies of the at least two resonance assemblies may be the same or similar. When the resonance frequencies of the resonance assemblies are the same or similar, the vibration damping effect in a frequency range near the resonance frequencies may be enhanced. For example, on the basis of the embodiments shown in FIG. 4, the vibration damping assembly 420 may further include another resonance assembly (including a mass element and a first elastic element). The resonance frequency of the resonance assembly may be the same or similar to that of the original resonance assembly (i.e., the resonance assembly formed by the mass element 423 and the first elastic element 421). For example, the resonance frequencies of the two resonance assemblies may be the second frequency "f0", which may enhance the vibration damping effect of the vibration damping assembly 420 in the frequency band near the second frequency "f0".

In some embodiments, the vibration assembly 110 may further include a second elastic element (e.g., a second elastic element 215 shown in FIG. 2). The second elastic element may connect the vibration element with the vibration housing. The mechanical vibrations generated by the vibration element may be transmitted to the vibration housing through the second elastic element, thereby causing the vibration plate to vibrate. More descriptions regarding the second elastic element may be found in other embodiments of the present disclosure (e.g., the embodiments shown in FIG. 2).

The fixing assembly 130 may fix and support the vibration assembly 110 and the vibration damping assembly 120, thereby keeping the speaker 100 in stable contact with facial skin of the user. The fixing assembly 130 may include one or more fixing connectors. One or more fixing connectors may be connected and fixed to the vibration assembly 110 and/or the vibration damping assembly 120. In some embodiments, binaural wearing may be achieved through the fixing assembly 130. For example, both ends of the fixing assembly 130 may be fixedly connected to two vibration assemblies 110 (or vibration damping assemblies 120), respectively. When the user wears the speaker 100, the fixing assembly 130 may respectively fix the two vibration assemblies 110 (or the vibration damping assemblies 120) near the left and right ears of the user. In some embodiments, one-ear wearing may be achieved through the fixing assembly 130. For example, the fixing assembly 130 may be only fixedly connected to one vibration assembly 110 (or vibration damping assembly 120). When the user wears the speaker 100, the fixing assembly 130 may fix the vibration assembly 110 (or the vibration damping assembly 120) near the ear on one side of the user. In some embodiments, the fixing assembly 130 may be eyeglasses, for example, any combination of one or more of sunglasses, augmented reality (AR) glasses, virtual reality (VR) glasses, helmets, and hair bands, which may not be limited herein.

The above description of the structure of the speaker 100 is a merely specific example, and should not be considered as the only feasible implementation. Obviously, for those skilled in the art, after understanding the basic principle of the speaker, it is possible to make various modifications and changes in the form and details of the specific manners and steps for implementing the speaker 100 without departing from this principle. However, these modifications and changes are still within the scope of the above description. For example, the speaker 100 may include one or more processors that may execute one or more sound signal processing algorithms. The sound signal processing algorithms may modify or enhance sound signals. For example, the sound processing algorithms may perform, on the sound signal, noise reduction, acoustic feedback suppression, wide dynamic range compression, automatic gain control, active environment recognition, active anti-noise, directional processing, tinnitus processing, multi-channel wide dynamic range compression, active howling suppression, volume control, or other similar processing, or any combination of the above. These modifications and changes are still within the protection scope of the claims of the present disclosure. As another example, the speaker 100 may include one or more sensors, such as a temperature sensor, a humidity sensor, a speed sensor, a displacement sensor. The sensors may collect user information or environmental information.

FIG.2 is a schematic diagram illustrating a longitudinal section of a speaker without a vibration damping assembly according to some embodiments of the present disclosure. As shown in FIG. 2, the speaker 200 may include a vibration assembly 210 and a fixing assembly 230.

In some embodiments, the vibration assembly 210 may include a vibration element 211, a vibration housing 213, and a second elastic element 215 elastically connected to the vibration element 211 and the vibration housing 213. The vibration element 211 may convert sound signals into mechanical vibration signals and generate mechanical vibrations. The mechanical vibrations generated by the vibration element 211 may be transmitted to the vibration housing 213 connected to the vibration element 211 through the second elastic element 215 to make the vibration housing 213 vibrate. It should be noted that when the vibration element 211 transmits the mechanical vibrations to the vibration housing 213 through the second elastic element 215, a vibration frequency of the vibration housing 213 may be the same as a vibration frequency of the vibration element 211.

The vibration element 211 in the present disclosure may refer to an element that converts acoustic signals into a mechanical vibration signals, for example, a transducer. In some embodiments, the vibration element 211 may include a magnetic circuit assembly and a coil. The magnetic circuit assembly may be configured to form a magnetic field, and the coil may vibrate mechanically in the magnetic field. Specifically, the coil may be fed with a signal current, and the coil may be in the magnetic field formed by the magnetic circuit assembly and subjected to the action of an Ampere force, thereby being driven to generate mechanical vibrations. At the same time, the magnetic circuit assembly may be subjected to a force opposite to the force of the coil. Under the action of Ampere force, the vibration element 211 may generate mechanical vibrations. The mechanical vibrations of the vibration element 211 may be transferred to the vibration housing 213, so that the vibration housing 213 may vibrate accordingly.

In some embodiments, the vibration housing 213 may include a vibration plate 2131, a side plate 2132, and a back plate 2133. The vibration plate 2131 may be referred to as a housing plate. The housing plate and the vibration plate 2131 may refer to an assembly of the vibration housing 213 that is in contact with facial skin of a user. The back plate 2133 may be located on a side of the vibration housing 213 opposite to the vibration plate 2131, that is, a side of the vibration housing 213 away from the facial skin of the user. In some embodiments, the vibration plate 2131 and the back plate 2133 may be respectively arranged on both ends of the side plate 2132. The vibration plate 2131, the side plate 2132, and the back plate 2133 may form a housing structure with a certain accommodation space. The vibration element 211 may be arranged inside the housing structure.

In some embodiments, the vibration plate 2131 and the side plate 2132 may be directly connected. For example, the vibration plate 2131 may be connected to the side plate 2132 by adhesion, riveting, welding, screw connection, integral molding, or the like. In some embodiments, the vibration plate 2131 and the side plate 2132 may be connected by a connector.

In some embodiments, the vibration plate 2131 and the side plate 2132 may be rigidly connected. For example, the vibration plate 2131 may be connected to the side plate 2132 by welding, riveting, etc., in such cases, the connection between the vibration plate 2131 and the side plate 2132 may be a rigid connection. In some embodiments, the vibration plate 2131 and the side plate 2132 may be elastically connected. For example, the vibration plate 2131 may be connected to the side plate 2132 through an elastic member (e.g., spring, foam, glue, etc.), in such cases, the connection between the vibration plate 2131 and the side plate 2132 may be an elastic connection. In some embodiments, the connector may have a certain degree of elasticity, so as to reduce a mechanical vibration intensity transmitted to the side plate and the back plate through the connector, thereby reducing a sound leakage caused by the vibration of the vibration housing. The elasticity of the connector may be determined by material, thickness, and structure of the connector. In some embodiments, the rigid connection or the elastic connection between the vibration plate 2131 and the side plate 2132 may be determined based on actual conditions, for example, which may be determined based on a connection between the vibration element 211 and the vibration housing 213. For example, in the embodiments shown in FIG. 4, when a vibration element 411 is connected to a side plate 4132, the vibration plate 4131 and the side plate 4132 may be rigidly connected. As another example, in the embodiments shown in FIG. 12, when a vibration element 1211 is connected to a vibration plate 12131, the vibration plate 12131 and the side plate 2132 may be elastically connected.

The material of the connector may include, but is not limited to steel (e.g., stainless steel, carbon steel, etc.), a light alloy (e.g., an aluminum alloy, a beryllium copper, a magnesium alloy, a titanium alloy, etc.), a plastic (e.g., a high molecular polyethylene, a blown nylon, an engineering plastic, etc.), or other single or composite materials that may achieve the same performance. The composite materials may include, but are not limited to reinforcement materials such as glass fiber, carbon fiber, boron fiber, graphite fiber, graphene fiber, silicon carbide fiber, or aramid fiber. The material of the connector may be a compound of other organic and/or inorganic materials, for example, glass fiber reinforced unsaturated polyester, epoxy resin or phenolic resin matrix composed of various types of FRP.

In some embodiments, a thickness of the connector may be no less than 0.005 mm. In some embodiments, the thickness of the connector may be in a range of 0.005 mm-3 mm. In some embodiments, the thickness of the connector may be in a range of 0.01 mm-2 mm. In some embodiments, the thickness of the connector may be in a range of 0.01 mm-1 mm. In some embodiments, the thickness of the connector may be in a range of 0.02 mm-0.5 mm.

In some embodiments, a structure of the connector may be set as a ring, and the ring connector may be formed in different shapes. For example, the connector may include at least one ring. As another example, the connector may include at least two rings, which may be concentric rings or non-concentric rings, and the rings are connected by at least two struts, and the struts radiate from an outer ring to a center of an inner ring. In some embodiments, the connector may include at least one elliptical ring. For example, the connector may include at least two elliptical rings, different elliptical rings have different curvature radii, and the elliptical rings are connected by struts. In some embodiments, the connector may include at least one square ring. In some embodiments, the connector may be set as a sheet. For example, a hollow pattern may be arranged on the sheet connector. In some embodiments, an area of the hollow pattern may be not less than an area of a non-hollowed out part of the connector. It should be noted that the materials, the thicknesses, and the structures of the connectors described above may be combined in any way to form different connectors. In some embodiments, the ring connector may have different thickness distributions. For example, thicknesses of the struts may be equal to a thickness of the ring. As another example, the thickness of the struts may be greater than the thickness of the ring. As a further example, the connector may include at least two rings, and the rings may be connected by at least two struts. The struts radiate from the outer ring to the center of the inner ring, and a thickness of the inner ring is greater than a thickness of the outer ring. In the embodiments, due to the vibration element 211 and the side plate 2132, the mechanical vibrations of the vibration plate 2131 origins from the mechanical energy transmitted from the side plate 2132. In order to ensure that the vibration plate 2131 has a sufficiently large mechanical vibration intensity to ensure that a sound volume received by the user's auditory nerve is relatively large, the vibration plate 2131 and the side plate 2132 may be set as a rigid connection.

In some embodiments, the vibration plate 2131, the side plate 2132, and the back plate 2133 may be made of the same or different materials. For example, the vibration plate 2131 and the side plate 2132 may be made of the same material, while the back plate 2133 may be made of different materials. In some embodiments, the vibration plate 2131, the side plate 2132, and the back plate 2133 may be made of different materials.

In some embodiments, the materials of the vibration plate 2131 may include, but are not limited to acrylonitrile butadiene styrene (ABS), polystyrene (PS), high influence polystyrene (HIPS), polypropylene (PP), polyethylene terephthalate (PET), polyester (PES), polycarbonate (PC), polyamides (PA), polyvinyl chloride (PVC), polyurethanes (PU), polyvinylidene chloride (PVDC), polyethylene (PE), polymethyl methacrylate (PMMA), poly-ether-ether-ketone (PEEK), phenolics (PF), urea-formaldehyde (UF), melamine formaldehyde (MF), metals, alloys (e.g., aluminum alloys, chrome-molybdenum steels, scandium alloys, magnesium alloys, titanium alloys, magnesium-lithium alloys, nickel alloys, etc.), glass fibers, carbon fibers, or the like, or any combination thereof. In some embodiments, the materials of the vibration plate 2131 may be glass fiber, carbon fiber, PC, PA, or the like, or any combination thereof. In some embodiments, the materials of the vibration plate 2131 may be made by mixing carbon fiber and PC based on a certain ratio. In some embodiments, the materials of the vibration plate 2131 may be made by mixing carbon fiber, glass fiber, and PC based on a certain ratio. In some embodiments, the materials of the vibration plate 2131 may be made by mixing glass fiber and PC based on a certain ratio, or by mixing glass fiber and PA based on a certain ratio.

In some embodiments, the vibration plate 2131 may need to have a certain thickness to ensure a rigidity of the vibration plate 2131. In some embodiments, the thickness of the vibration plate 2131 may not be less than 0.3 mm. In some embodiments, the thickness of the vibration plate 2131 may not be less than 0.5 mm. In some embodiments, the thickness of the vibration plate 2131 may not be less than 0.8 mm. In some embodiments, the thickness of the vibration plate 2131 may not be less than 1 mm. As the thickness of the vibration plate 2131 increases, a weight of the vibration housing 213 may increase, thereby increasing the weight of the speaker 200 and affecting a sensitivity of the speaker 200. Therefore, the thickness of the vibration plate 2131 should not be too large. In some embodiments, the thickness of the vibration plate 2131 may not exceed 2.0 mm. In some embodiments, the thickness of the vibration plate 2131 may not exceed 1.5 mm.

In some embodiments, parameters of the vibration plate 2131 may include a relative density, a tensile strength, an elastic modulus, a Rockwell hardness, etc. of the materials of the vibration plate 2131. In some embodiments, the relative density of the material of the vibration plate may be in a range of 1.02-1.50. In some embodiments, the relative density of the material of the vibration plate may be in a range of 1.14-1.45. In some embodiments, the relative density of the material of the vibration plate may be in a range of 1.15-1.20. In some embodiments, the tensile strength of the material of the vibration plate may be no less than 30 MPa. In some embodiments, the tensile strength of the material of the vibration plate may be in a range of 33 MPa-52 MPa. In some embodiments, the tensile strength of the material of the vibration plate may not be less than 60 MPa. In some embodiments, the elastic modulus of the material of the vibration plate may be in a range of 1.0 GPa-5.0 GPa. In some embodiments, the elastic modulus of the material of the vibration plate may be in a range of 1.4 GPa-3.0 GPa. In some embodiments, the elastic modulus of the material of the vibration plate may be in a range of 1.8 GPa-2.5 GPa. In some embodiments, the hardness (Rockwell hardness) of the material of the vibration plate may be in a range of 60-150. In some embodiments, the hardness of the material of the vibration plate may be in a range of 80-120. In some embodiments, the hardness of the material of the vibration plate may be in a range of 90-100. In some embodiments, the relative density and tensile strength of the material of the vibration plate are considered at the same time, the relative density may be in a range of 1.02-1.1, and the tensile strength may be in a range of 33 MPa-52 MPa. In some embodiments, the relative density may be in a range of 1.20-1.45, and the tensile strength may be in a range of 56 MPa-66 MPa.

In some embodiments, the vibration plate 2131 may be arranged in different shapes. For example, the vibration plate 2131 may be arranged in a square shape, a rectangular shape, an approximately rectangular (e.g., four corners of a rectangular are replaced with arc-like structures) shape, an oval shape, a circular shape, or other arbitrary shapes.

In some embodiments, the vibration plate 2131 may be composed of the same material. In some embodiments, the vibration plate 2131 may be formed by stacking two or more materials. In some embodiments, the vibration plate 2131 may be composed of a layer of material with a higher Young's modulus and an additional layer of material with a lower Young's modulus, which may increase the comfort of the contact with the human face and improve the cooperation between the vibration plate 2131 and the contact with the human face while ensuring the rigidity requirements of the vibration plate 2131. In some embodiments, the material with a higher Young's modulus may be acrylonitrile butadiene styrene (ABS), polystyrene (PS), high influence polystyrene (HIPS), polypropylene (PP), polyethylene terephthalate (PET), polyester (PES), polycarbonate (PC), polyam ides (PA), polyvinyl chloride (PVC), polyurethanes (PU), polyvinylidene chloride, polyethylene (PE), polymethyl methacrylate (PMMA), poly-ether-ether-ketone (PEEK), phenolics (PF), urea-formaldehyde (UF), melamine formaldehyde(MF), metal, alloy (e.g., aluminum alloy, chrome-molybdenum steel, scandium alloy, magnesium alloy, titanium alloy, magnesium-lithium alloy, nickel alloy, etc.), glass fiber, carbon fiber, or the like, or any combination thereof.

In some embodiments, the vibration plate 2131 may be in direct contact with the facial skin of the user. In some embodiments, a contact part of the vibration plate 2131 with the facial skin of the user may be an entire or part of the area of the vibration plate 2131. For example, the vibration plate 2131 may have an arc structure, and a part of the arc structure may be in contact with the facial skin of the user. In some embodiments, the vibration plate 2131 may be in surface contact with the facial skin of the user. In some embodiments, the surface of the vibration plate 2131 in contact with the facial skin of the user may be a plane. In some embodiments, an outer surface of the vibration plate 2131 may have some protrusions or depressions. In some embodiments, the outer surface of the vibration plate 2131 may be a curved surface with any contour.

In some embodiments, the vibration plate 2131 may be in indirect contact with the facial skin of the user. For example, the vibration plate 2131 may be provided with the vibration transmission layer in the foregoing embodiments. The vibration transmission layer may be interposed between the vibration plate 2131 and the facial skin of the user, and be in contact with the facial skin of the user instead of the vibration plate 2131.

It should be noted that due to the vibration element 211 includes a magnetic circuit assembly, and the vibration element 211 is accommodated in the vibration housing 213, when a volume of the vibration housing 213 (i.e., a volume of the accommodation space) is larger, the vibration housing 213 may accommodate a larger magnetic circuit assembly, so that the speaker 200 may have a higher sensitivity. The sensitivity of the speaker 200 may be reflected by the volume generated by the speaker 200 when a certain sound signal is input. When the same sound signal is input, the louder the volume generated by the speaker 200 is, the higher the sensitivity of the speaker 200 is. In some embodiments, the volume of the speaker 200 may become larger as the volume of the accommodation space of the vibration housing 213 increases. Therefore, the present disclosure may further have a certain requirement for the volume of the vibration housing 213. In some embodiments, in order to make the speaker 200 have relatively high sensitivity (volume), the volume of the vibration housing 213 may be in a range of 2000 $mm^3$-6000 $mm^3$. In some embodiments, the volume of the vibration housing 213 may be in a range of 2000 $mm^3$-5000 $mm^3$. In some embodiments, the volume of the vibration housing 213 may be in a range of 2800 $mm^3$-5000 $mm^3$. In some embodiments, the volume of the vibration housing 213 may be in a range of 3500 $mm^3$-5000 $mm^3$. In some embodiments, the volume of the vibration housing 213 may be in a range of 1500 $mm^3$-3500 $mm^3$. In some embodiments, the volume of the vibration housing 213 may be in a range of 1500 $mm^3$-2500 $mm^3$.

In some embodiments, the fixing assembly 230 may be fixedly connected to the vibration housing 213 of the vibration assembly 210. The fixing assembly 230 may be configured to keep the stable contact between the speaker 200 and the facial skin of the user, thereby avoiding the shaking of the speaker 200, and ensuring the vibration plate 2131 can stably transmit sound. In some embodiments, the fixing assembly 230 may be an arc-shaped elastic assembly, which may form a force of rebounding toward the middle of the arc, so as to be in stable contact with the human skull. Taking an ear hook as the fixing assembly 230 as an example, on the basis of FIG. 2, point "p" at the top of the ear hook fits well with the head of the human body, and the point "p" at the top may be considered as the fixing point. The ear hook may be fixedly connected to the side plate 2132. The ear hook may be fixedly connected to the side plate 2132 or the back plate 2133 by glue, clamping, welding, or a threaded connection. The part of the ear hook connected to the vibration housing 213 may be made of the same, different, or partly the same material as the side plate 2132 or the back plate 2133. In some embodiments, in order to make the ear hook have a relatively small rigidity (i.e., a relatively small stiffness coefficient), the ear hook may include plastic, silicone, and/or metal materials. For example, arc-shaped titanium wires may be included in the ear hook. In some embodiments, the ear hook may be integrally formed with the side plate 2132 or the back plate 2133. More examples regarding the vibration assembly 210 and the vibration housing 213 may be found in PCT International Patent Application No. PCT/CN2019/070545, filed on Jan. 5, 2019, and International Patent Application No. PCT/CN2019/070548, filed on Jan. 5, 2019, the entire contents of each of which are incorporated into the present disclosure by reference.

As mentioned above, the vibration assembly 210 may include the second elastic element 215. The second elastic element 215 may be configured to elastically connect the vibration element 211 to the vibration housing 213 (e.g., the side plate 2132 of the vibration housing 213), so that the mechanical vibrations of the vibration element 211 may be transmitted to the side plate 2132 of the vibration housing 213 through the second elastic element 215, accordingly, the vibration plate 2131 may vibrate. After generating mechanical vibrations, the vibration plate 2131 may transmit, by being in contact with the facial skin of a wearer (or a user), the mechanical vibrations to the auditory nerve through bones in a way of bone conduction, so that the user can hear sound.

In some embodiments, the vibration element 211 and the second elastic element 215 may be accommodated inside the vibration housing 213, and the second elastic element 215 may connect the vibration element 211 to an inner wall of the vibration housing 213. In some embodiments, the second elastic member 215 may include a first part and a second part. The first part of the second elastic element 215 may be connected to the vibration element 211 (e.g., the magnetic circuit assembly of the vibration element 211), and the second part of the second elastic element 215 may be connected to the inner wall of the vibration housing 213.

In some embodiments, the second elastic element 215 may be a vibration transmission sheet. The first part of the vibration transmission sheet may be connected to the vibration element 211, and the second part of the vibration transmission sheet may be connected to the vibration housing 213. Specifically, the first part of the vibration transmission sheet may be connected to the magnetic circuit assembly of the vibration element 211, and the second part of the vibration transmission sheet may be connected to the inner wall of the vibration housing 213. Optionally, the vibration transmission sheet may have a ring structure, and the first part of the vibration transmission sheet may be closer to a central area of the vibration transmission sheet than the second part. For example, the first part of the vibration transmission sheet may be located in the central area of the vibration transmission sheet, while the second part may be located at a peripheral side of the vibration transmission sheet.

In some embodiments, the vibration transmission sheet may be an elastic member. The elasticity of the vibration transmission sheet may be determined by material, thickness, and structure of the vibration transmission sheet.

In some embodiments, the material of the vibration transmission sheet may include, but is not limited to, a plastic (e.g., but is not limited to high molecular polyethylene, blown nylon, engineering plastics, etc.), steel (e.g., but is not limited to stainless steel, carbon steel, etc.), a light alloy (e.g., but is not limited to, an aluminum alloy, a beryllium copper, a magnesium alloy, a titanium alloy, etc.), or other single or composite materials that may achieve the same performance. The composite materials may include, but are not limited to reinforcing materials such as glass fibers, carbon fibers, boron fibers, graphite fibers, graphene fibers, silicon carbide fibers, aramid fibers, or a compound of other organic and/or inorganic materials such as glass fiber reinforced unsaturated polyester, epoxy resin or phenolic resin matrix composed of various types of FRP.

In some embodiments, the vibration transmission sheet may have a certain thickness. In some embodiments, the thickness of the vibration transmission sheet may not be less than 0.005 mm. In some embodiments, the thickness of the vibration transmission sheet may be in a range of 0.005 mm-3 mm. In some embodiments, the thickness of the vibration transmission sheet may be in a range of 0.01 mm-2 mm. In some embodiments, the thickness of the vibration transmission sheet may be in a range of 0.01 mm-1 mm. In some embodiments, the thickness of the vibration transmission sheet may be in a range of 0.02 mm-0.5 mm.

In some embodiments, the elasticity of the vibration transmission sheet may be provided by a structure of the vibration transmission sheet. For example, the vibration transmission sheet may be an elastic structure, and even if the material of the vibration transmission sheet has relatively high rigidity, the structure of vibration transmission sheet may provide elasticity. In some embodiments, the structure of the vibration transmission sheet may include, but is not limited to, a spring-like structure, a ring, or a ring-like structure, or the like. In some embodiments, the structure of the vibration transmitting plate may further be set as a sheet. In some embodiments, the structure of the vibration transmitting plate may be set as a bar. The materials, the thicknesses, and the structures of the vibration transmission sheets described above may be combined in any way to form different vibration transmission sheets. For example, the sheet-shaped vibration transmission sheet may have different thickness distributions, and the thickness of the first part of the vibration transmission sheet may be greater than the thickness of the second part of the vibration transmission sheet. In some embodiments, there may be one or more vibration transmission sheets. For example, there may be two vibration transmission sheets, the second parts of the two vibration transmission sheets may be respectively connected to the inner walls of the two side plates 2132 opposite to each other, and the first parts of the two vibration transmission sheets may be connected to the vibration element 211.

In some embodiments, the vibration transmission sheet may be directly connected to the vibration housing 213 and the vibration element 211. For example, the vibration transmission sheet may be connected to the vibration element 211 and the vibration housing 213 by glue. As another example, the vibration transmission sheet may be fixed with the vibration element 211 and the vibration housing 213 by welding, clamping, riveting, a threaded connection (e.g., connection by cap screw, screw, screw rod, bolt, etc.), a clamp connection, a pin connection, a wedge key connection, or integral molding. More examples regarding the vibration transmission sheet may be found in PCT International Patent Application No. PCT/CN2019/070545, filed on Jan. 5, 2019, and International Patent Application No. PCT/CN2019/070548, filed on Jan. 5, 2019, the entire contents of each of which are incorporated into the present disclosure by reference.

In some embodiments, the vibration assembly 210 may further include a first vibration transmitting connector. The vibration transmission sheet may be connected to the vibration element 211 through the first vibration transmitting connector. In some embodiments, as shown in FIG. 2, the first vibration transmitting connector may be fixedly connected to the vibration element 211. For example, the first vibration transmitting connector may be fixed on a surface of the vibration element 211. In some embodiments, a first part of the vibration element 211 may be fixedly connected to the first vibration transmitting connector. The vibration transmission sheet may be fixed on the first vibration transmitting connector by welding, clamping, riveting, a screw connection (e.g., connection by cap screw, screw, screw rod, bolt, etc.), a clamp connection, a pin connection, a wedge key connection, or integral molding.

In some embodiments, the vibration assembly 210 may include a second vibration transmitting connector, and the second vibration transmitting connector may be fixed on the inner wall of the vibration housing 213. For example, the second vibration transmitting connector may be fixed to the inner wall of the side plate 2132. The vibration transmission sheet may be connected to the vibration housing 213 through the second vibration transmitting connector. In some embodiments, a second part of the vibration element 211 may be fixedly connected to the second vibration transmitting connector. The connection manner between the second vibration transmitting connector and the vibration transmission sheet may be the same as or similar to the connection manner of the first vibration transmitting connector and the vibration transmission sheet in the foregoing embodiments, which may not be repeated herein.

Figure 3:
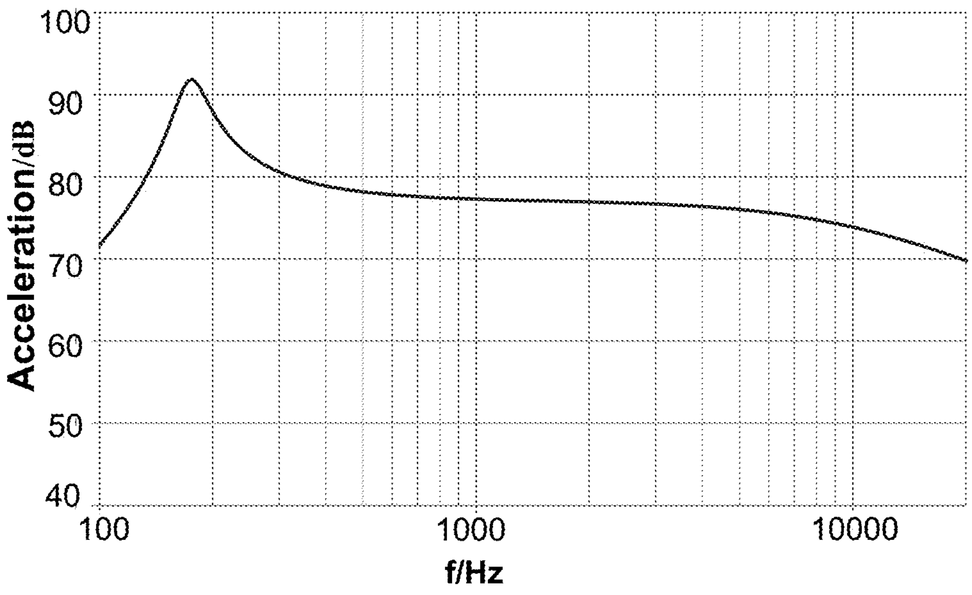
FIG. 3 is a schematic diagram illustrating a partial frequency response curve of a speaker without a vibration damping assembly according to some embodiments of the present disclosure.

FIG. 3 is a schematic diagram illustrating a partial frequency response curve of the speaker 200 without a vibration damping assembly according to some embodiments of the present disclosure. In FIG. 3, a horizontal axis may be the frequency, and a vertical axis may be a vibration intensity (or a vibration amplitude) of the speaker 200. The vibration intensity may be understood as a vibration acceleration of the speaker 200. The larger the value on the vertical axis is, the larger the vibration amplitude of the speaker 200 is, which indicates the stronger the vibration sense of the speaker 200 is. For the convenience of description, in some embodiments, a sound frequency range below 500 Hz may be a low frequency region, a sound frequency range between 500 Hz-4000 Hz may be a middle frequency region, and a sound frequency range greater than 4000 Hz may be a high frequency region. In some embodiments, sounds in the low frequency region may bring the user a more obvious feeling of vibration, if a very sharp peak appears in the low frequency region (i.e., the vibration accelerations at frequencies corresponding to the sharp peak are much higher than the vibration accelerations at other nearby frequencies), on one hand, the sound heard by the user may be harsh and sharp, on the other hand, the strong vibration may further bring uncomfortable feeling. Therefore, in the low frequency region, sharp peaks and valleys may not be expected to appear, and the flatter the frequency response curve, the better the sound effect of the speaker 200.

As shown in FIG. 3, the speaker 200 may generate a low frequency resonance peak in the low frequency region (near 100 Hz). For the convenience of description, it may be considered that the speaker 200 generates a first resonance peak at the first frequency. The low frequency resonance peak may be understood to be generated by the cooperation of the vibration assembly 210 and the fixing assembly 230. The vibration acceleration of the low frequency resonance peak may be relatively large, which results in a strong feeling of vibration on the vibration plate 2131, thereby causing the user to feel pain on the face when wearing the speaker 200, accordingly affecting the comfort and experience of the user.

FIG. 4 is a schematic diagram illustrating a longitudinal section of a speaker with a vibration damping assembly according to some embodiments of the present disclosure. As shown in FIG. 4, the speaker 400 may include a vibration assembly 410 and a vibration damping assembly 420.

In some embodiments, the vibration assembly 410 may include a vibration element 411, a vibration housing 413, and a second elastic element 415. The vibration housing 413 may include a vibration plate 4131, a side plate 4132, and a back plate 4133. The side plate 4132 of the vibration housing 413 may be elastically connected to the vibration element 411 through the second elastic element 415. When the vibration element 411 mechanically vibrates, the mechanical vibrations may be transmitted to the side plate 4132 through the second elastic element 415, and then transmitted to the vibration plate 4131 and the back plate 4133 through the side plate 4132 to cause the vibration plate 4131 and the back plate 4133 to vibrate. In some embodiments, the vibration element 411, the vibration housing 413, and the second elastic element 415 may be the same or similar to the vibration element 211, the vibration housing 213, and the second elastic element 215 in the speaker 200, respectively, and the details of the corresponding structures are not repeated.

In some embodiments, the vibration damping assembly 420 may include a mass element 423 and a first elastic element 421. The first elastic element 421 may be fixedly connected to the mass element 423 to form a resonance assembly. The mass element 423 may be connected to the vibration housing 413 through the first elastic element 421. The vibration housing 413 may transmit the mechanical vibrations to the mass element 423 through the first elastic element 421 to drive the mass element 423 to vibrate. When the mass element 423 vibrates, a vibration acceleration, that is, a vibration intensity of the vibration housing 413 may be weakened, thereby reducing the vibration feeling of the vibration housing 413 and improving user experience.

In some embodiments, the first elastic element 421 may be connected to any position of the vibration housing 413 except the vibration plate 4131. For example, the first elastic element 421 may be connected to the side plate 4132 or the back plate 4133. For example, in the example shown in FIG. 4, the first elastic element 421 may be connected to an outer wall of the back plate 4133.

Figure 5:
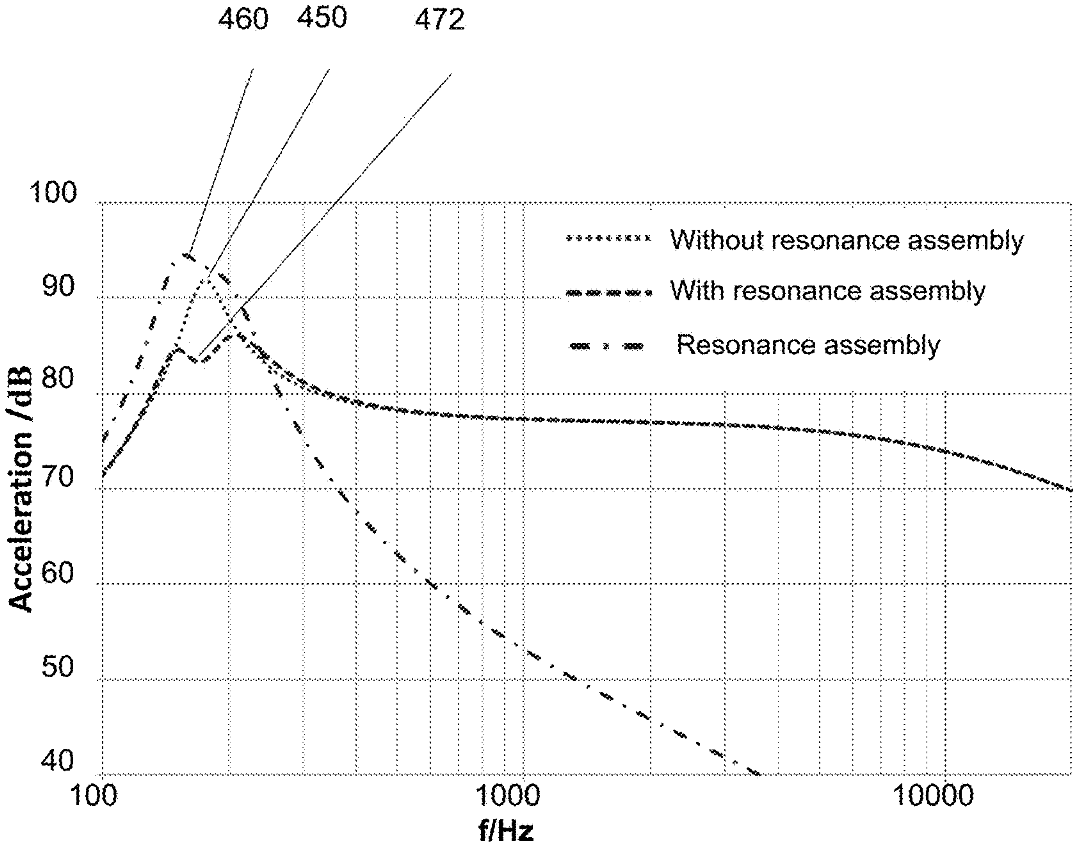
FIG. 5 is a schematic diagram illustrating frequency response curves according to some embodiments of the present disclosure.

FIG. 5 is a schematic diagram illustrating frequency response curves according to some embodiments of the present disclosure. In addition, FIG. 5 shows a frequency response curve of a resonance assembly (formed by the first elastic element and the mass element). According to FIG. 5, under the influence of the resonance assembly, the frequency response curve of the speaker 400 in the low frequency region becomes flatter, which reduces the vibration feeling caused by the sharp low frequency resonance peak, thereby improving the user experience.

Figure 6:
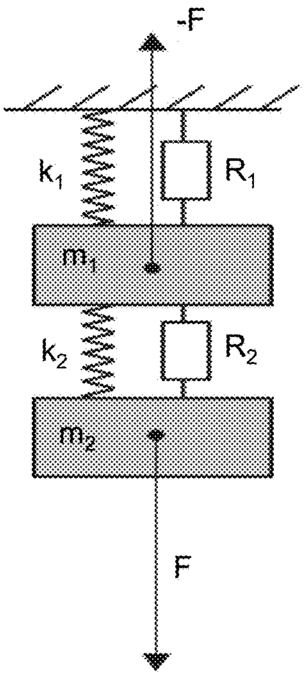
FIG. 6 is a schematic diagram illustrating a simplified mechanical model of a speaker without a vibration damping assembly according to some embodiments of the present disclosure.

FIG. 6 is a schematic diagram illustrating a simplified mechanical model of a speaker without a vibration damping assembly according to some embodiments of the present disclosure. For the convenience of understanding, when a speaker does not include a resonance assembly (i.e., formed by a mass element and a first elastic element), a mechanical model of the speaker may be equivalent to a model shown in FIG. 6. For the convenience of analysis and description, a vibration housing and a vibration element may be simplified as a mass $m_1$ and a mass $m_2$, a fixing assembly (e.g., an ear hook) may be simplified as an elastic connector $k_1$, and a second elastic element may be simplified as an elastic connector $k_2$, a damping of the elastic connector $k_1$ and the elastic connector $k_2$ may be $R_1$ and $R_2$, respectively. The vibration housing and the vibration element may be respectively subjected to an Ampere force F and a reaction force-F of the Ampere force to vibrate. A composite vibration system composed of the vibration housing, the vibration element, the second elastic element, and the fixing assembly may be fixed at point "p" on the top of the ear hook.

Figure 7:
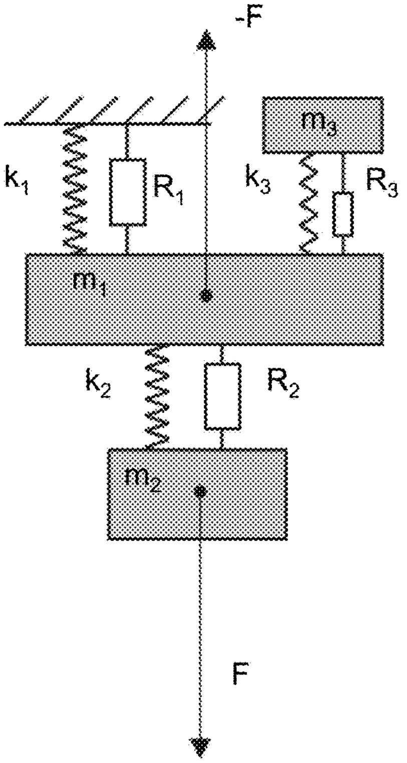
FIG. 7 is a schematic diagram illustrating a simplified mechanical model of a speaker with a vibration damping assembly according to some embodiments of the present disclosure.

FIG. 7 is a schematic diagram illustrating a simplified mechanical model of a speaker with a vibration damping assembly according to some embodiments of the present disclosure. Similar to FIG. 6, for the convenience of understanding, when a speaker includes a resonance assembly (formed by a mass element and a first elastic element), a mechanical model of the speaker may be equivalent to a model shown in FIG. 7. As shown in FIG. 7, a mass $m_1$ and a mass $m_2$ may respectively represent the vibration housing and the vibration element, a mass $m_3$ may represent the mass element in the resonance assembly, $k_1$ and $R_1$ may respectively represent an elasticity and a damping of a fixing assembly (e.g., an ear hook), $k_2$ and $R_2$ may respectively represent an elasticity and a damping of a second elastic element, and $k_3$ and $R_3$ may respectively represent an elasticity and a damping of the first elastic element. The entire composite vibration system may be fixed at point "p" on the top of the ear hook. The vibration housing and the vibration element may be respectively subjected to a force F and a force −F to vibrate. The addition of the resonance assembly is equivalent to increasing a rigidity and a damping of the vibration housing, while the Ampere force F and the reaction force −F of the Ampere force are not changed, therefore the addition of the resonance assembly can weaken a vibration amplitude of the vibration housing.

In some embodiments, the vibration assembly 410 and the resonance assembly may respectively produce a low frequency resonance peak at a specific frequency in a low frequency region. The mechanical vibrations of the vibration housing 413 may be absorbed through the resonance assembly, which achieves a purpose of weakening amplitudes of the mechanical vibrations of the vibration housing 413 at the low frequency resonance peak. As shown in FIG. 5, a curve "without resonance assembly" represents the frequency response of the speaker 400 without a resonance assembly. It may be seen that the vibration assembly 410 (combined with the fixing assembly 430) may generate a first resonance peak 450 at a first frequency "f". A curve "resonance assembly " may represent the frequency response of the resonance assembly. It may be seen that the resonance assembly may generate a second resonance peak 460 at a second frequency "f0".A curve "with resonance assembly" may represent the frequency response of the speaker 400 resulting from the interaction of the vibration assembly 410 and the resonance assembly. It can be seen that the frequency response of the speaker 400 with the resonance assembly in the low frequency region (e.g., 100 Hz-200 Hz) is flatter than the frequency response of the speaker (e.g., the speaker 200 shown in FIG. 2) without the resonance assembly in the low frequency region, and the amplitude near the first frequency "f" (i.e., the frequency corresponding to the first resonance peak 450) corresponding to the curve "with resonance assembly" is significantly less than the amplitude corresponding to the curve "without resonance assembly".

In some exemplary application scenarios, the mechanical vibrations generated by the vibration element 411 may be transmitted to the vibration housing 413 through the second elastic element 415, so that the vibration housing 413 may be forced to vibrate. Therefore, a vibration frequency of the vibration housing 413 may be the same as a vibration frequency of the vibration element 411. Similarly, the vibration housing 413 may transmit the mechanical vibrations to the mass element 423 of the resonance assembly through the first elastic element 421 to cause the mass element 423 to be forced to vibrate. Therefore, a vibration frequency of the mass element 423 may be the same as the vibration frequency of the vibration housing 413. It can be known from a change law of the frequency response curve of the resonance assembly in FIG. 5 that within a range from 100 Hz to the second frequency "f0" (i.e., the frequency corresponding to the second resonance peak 460), a vibration acceleration of the resonance assembly increases as the frequency increases. When the frequency is the second frequency "f0", the second resonance peak 460 appears. When the frequency continues to increase beyond the second frequency "f0", the vibration acceleration of the resonance assembly decreases as the frequency increases. The frequency response curve of the resonance assembly may reflect the response of the resonance assembly to external vibrations (i.e., the vibrations of the vibration housing 413) of different frequencies. For example, at the second frequency "f0" and in a frequency range nearby, the resonance assembly may absorb more vibration energy from the vibration housing 413, which brings the benefit that the resonance assembly mainly reduces the vibrations of the vibration housing 413 near the low frequency band (e.g., the frequency corresponding to the first resonance peak 450), and has little or no influence on the vibrations of the vibration housing 413 away from the low frequency resonance peak, thereby finally making the frequency response curve of the speaker 400 flatter and the sound quality better.

In some embodiments, the first frequency "f" may be a natural frequency of the vibration assembly 410 (combined with the fixing assembly 430), and the second frequency "f0" may be the natural frequency of the resonance assembly. In some embodiments, the natural frequency may be related to the material, the mass, the elastic coefficient, the shape, and other factors of the structure.

In some embodiments, in order to allow the resonance assembly to effectively weaken the vibration intensity of the first resonance peak 450 of the vibration housing 413, the second frequency "f0" corresponding to the second resonance peak 460 of the resonance assembly may be set near the first frequency "f" corresponding to the first resonance peak 450 of the vibration housing 413. As shown in FIG. 5, in some embodiments, a ratio of the second frequency "f0" to the first frequency "f" is in a range of 0.5-2. In some embodiments, the ratio of the second frequency "f0" to the first frequency "f" may be in a range of 0.65-1.5. In some embodiments, the ratio of the second frequency "f0" to the first frequency "f" may be in a range of 0.75-1.25. In some embodiments, the ratio of the second frequency "f0" to the first frequency "f" may be in a range of 0.85-1.15. In some embodiments, the ratio of the second frequency "f0" to the first frequency "f" may be in a range of 0.9-1.1.

In order to widen the frequency response range of the speaker 400, the structures and materials of the vibration assembly 410 and the resonance assembly may be changed to control their low frequency resonance peaks (e.g., the first resonance peak 450 and the second resonance peak 460) at lower frequencies. In some embodiments, the first resonance peak 450 and the second resonance peak 460 may be set in the low frequency region. In some embodiments, the first frequency "f" and the second frequency "f0" may be less than 800 Hz. In some embodiments, the first frequency "f" and the second frequency "f0" may be less than 700 Hz. In some embodiments, the first frequency "f" and the second frequency "f0" may be less than 600 Hz. In some embodiments, the first frequency "f" and the second frequency "f0" may be less than 500 Hz.

In some embodiments, by controlling the structures and materials of the resonance assembly (e.g., controlling the mass of the mass element 423, the elastic coefficient of the first elastic element 421, etc.), it can be made that after the vibration housing 413 transmits the vibrations to the resonation assembly, the resonance assembly may produce larger vibrations than the vibration housing 413. For example, in at least part of the frequency range less than (or greater than) the first frequency "f", the vibration amplitude of the resonance assembly may be greater than the vibration amplitude of the vibration housing 413. In some embodiments, the fixing assembly 430 may be connected to the vibration housing 413, due to that the resonance assembly does not directly contact the user, the large-scale vibrations of the resonance assembly may not make the user feel uncomfortable vibration. In some embodiments, due to the relatively large amplitude of the resonance assembly, the mass element 423 in the resonance assembly may be designed as a structure with a relatively large area. When the resonance assembly vibrates, the vibrations of mass assembly 423 with the relatively large area may drive air to vibrate to generate low frequency air-conduction sound, thereby enhancing the low frequency response of the speaker 400. For example, the mass element 423 may be set as a plate-shaped member (e.g., a circular plate, a square plate, etc.), and the plate-shaped member may drive air to vibrate when vibrating, thereby generating air-conducted sound.

As shown in FIG. 5, in some embodiments, under the interaction between the vibration housing 413 and the resonance assembly, the speaker 400 may produce a valley 472 in the low frequency region (about 150 Hz-200 Hz). The vibration acceleration of the valley 472 is less than the vibration acceleration of the first resonance peak 450. Due to the formation of the valley 472, a peak value of the vibration acceleration of the speaker 400 may be reduced. As shown in FIG. 5, there are two vibration acceleration peaks in the speaker 400, both of which are less than the vibration acceleration of the first resonance peak 450. The above contents show that the speaker 400 with a resonance assembly not only produces a lower valley of the vibration acceleration, but further has a smaller peak value of the vibration acceleration than the speaker without a resonance assembly (e.g., the speaker 200 shown in FIG. 2). That is, the vibration housing 413 has a weaker vibration feeling in the low frequency region, which makes the user experience better when wearing the speaker 400.

In some embodiments, the speaker 400 may produce a valley in a frequency range less than 450 Hz. In some embodiments, the speaker 400 may produce a valley in a frequency range less than 400 Hz. In some embodiments, the speaker 400 may produce a valley in a frequency range less than 350 Hz. In some embodiments, the speaker 400 may produce a valley in a frequency range less than 300 Hz. In some embodiments, the speaker 400 may produce a valley in a frequency range less than 200 Hz.

In some exemplary application scenarios, since the mass of the resonance assembly is mainly provided by the mass element 423, when the mass $m_3$ of the mass element 423 is so small that the mass ratio of the mass $m_3$ of the mass element 423 to the mass $m_1$ of the vibration housing 413 is too small, the resonance assembly has little influence on the amplitude of the mechanical vibration of the speaker 400, which results in that the mechanical vibrations near the first resonance peak 450 of the vibration housing 413 cannot be effectively weakened. For example, if the mass ratio of the mass $m_3$ of the mass element 423 to the mass $m_1$ of the vibration housing 413 is too small, the influence of the resonance assembly on the magnitude of the mechanical vibrations of the vibration housing 413 may be ignored, which results in that the vibration acceleration of the first resonance peak 450 of the vibration housing 413 is still relatively large, so that the vibration feeling of the speaker 400 may not effectively be reduced.

In other exemplary application scenarios, when the mass $m_3$ of the mass element 423 is so large that the mass ratio of the mass $m_3$ of the mass element 423 to the mass $m_1$ of the vibration housing 413 is too large, the influence of the resonance assembly on the magnitude of the mechanical vibration of the speaker 400 is too large, which may significantly change the frequency response of the speaker 400. Therefore, the mass $m_3$ of the mass element 423 of the resonance assembly may need to be controlled within a certain range.

In some embodiments, the mass ratio of the mass $m_3$ of the mass element 423 of the resonance assembly to the mass $m_1$ of the vibration housing 413 may be in a range of 0.04-1.25. In some embodiments, the mass ratio of the mass $m_3$ of the mass element 423 of the resonance assembly to the mass $m_1$ of the vibration housing 413 may be in a range of 0.05-1.2. In some embodiments, the mass ratio of the mass $m_1$ of the mass element 423 of the resonance assembly to the mass $m_1$ of the vibration housing 413 may be in a range of 0.06-1.1. In some embodiments, the mass ratio of the mass $m_3$ of the mass element 423 of the resonance assembly to the mass $m_1$ of the vibration housing 413 may be in a range of 0.07-1.05. In some embodiments, the mass ratio of the mass $m_3$ of the mass element 423 of the resonance assembly to the mass $m_1$ of the vibration housing 413 may be in a range of 0.08-0.9. In some embodiments, the mass ratio of the mass $m_3$ of the mass element 423 of the resonance assembly to the mass $m_1$ of the vibration housing 413 may be in a range of 0.09-0.75. In some embodiments, the mass ratio of the mass $m_3$ of the mass element 423 of the resonance assembly to the mass $m_1$ of the vibration housing 413 may be in a range of 0.1-0.6.

In some embodiments, the material of the mass element 423 may include, but is not limited to a plastic, a metal, a composite material, or the like. In some embodiments, the mass element 423 may be an independent structure. In some embodiments, the mass element 423 may be combined with other assemblies of the speaker 400 as a composite structure. For example, in the embodiments shown in FIG. 8, the first elastic element 821 may be a diaphragm, and the mass element 823 may be arranged on a surface of the diaphragm as a composite structure to form a composite diaphragm structure with the diaphragm. In the composite diaphragm structure, the mass element 823 may include at least one of a paper cone, an aluminum sheet, a copper sheet, or the like. In some embodiments, the speaker 400 may further include functional elements, and the mass element 423 may be combined with the functional elements as a composite structure. In other embodiments, the mass element 423 may be a functional element. The functional element may refer to an assembly for realizing one or more specific functions of the speaker 400. Exemplary functional element may include at least one of battery, a printed circuit board, a communication assembly, or the like.

Figure 9:
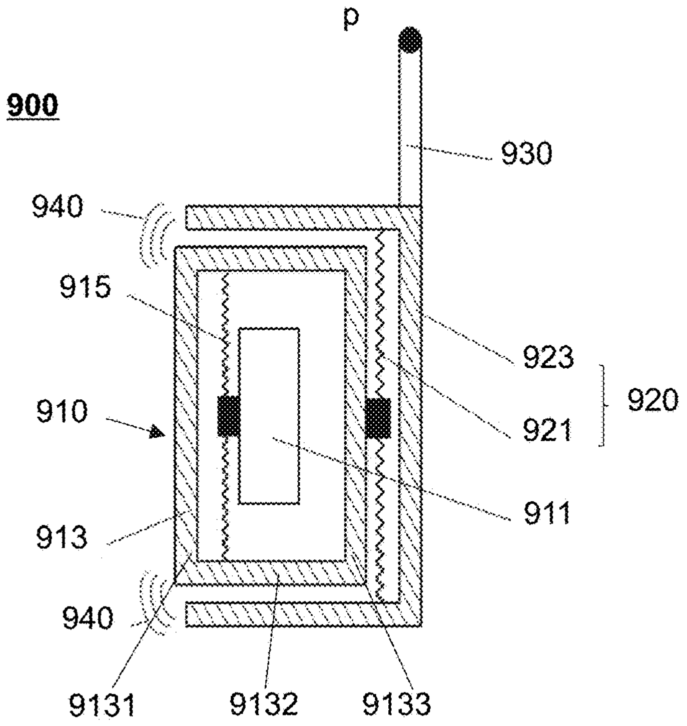
FIG. 9 is a schematic diagram illustrating a longitudinal section of a speaker in which a mass element is a groove member according to some embodiments illustrating the present disclosure.

In some embodiments, the mass element 423 may be one or a combination of a plate-like structure, a block-like structure, a spherical structure, a columnar structure, a cone-like structure, a bar-like structure, or any other possible structure. For example, a mass element 923 may be a circular plate-like structure. As another example, as shown in FIG. 9, the mass element 923 may be a groove member, and the groove member may be a square groove (a cross-sectional shape of the groove is a square) or a circular groove (a cross-sectional shape of the groove is a circle). Based on the above contents, the specific shape and structure of the mass element in the present disclosure may be designed according to actual needs.

Figure 8:
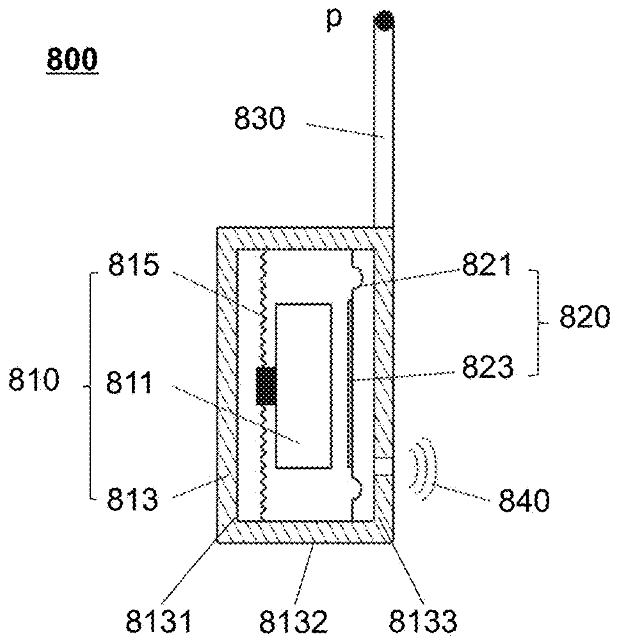
FIG. 8 is a schematic diagram illustrating a longitudinal section of a speaker in which a first elastic element is a diaphragm according to some embodiments of the present disclosure.

FIG. 8 is a schematic diagram illustrating a longitudinal section of a speaker in which a first elastic element is a diaphragm according to some embodiments of the present disclosure. As shown in FIG. 8, the speaker 800 may include a vibration assembly 810 and a vibration damping assembly 820. The vibration assembly 810 may generate mechanical vibrations and be in contact with facial skin of a user, and transmit the mechanical vibrations to the user's auditory nerve through the facial skin of the user in a way of bone conduction. The vibration damping assembly 820 may reduce the vibration feeling brought to the user when the vibration assembly vibrates.

In some embodiments, the vibration assembly 810 may include a vibration element 811, a vibration housing 813, and a second elastic element 815. The vibration element may generate mechanical vibrations based on electrical signals. The vibration element 811 may be elastically connected to the vibration housing 813 through the second elastic element 815. When the vibration element 811 generates the mechanical vibrations, the mechanical vibrations may be transmitted to the vibration housing 813 through the second elastic element 815 to drive the vibration housing 813 to vibrate, and then the vibrations may be transmitted to the facial skin of the user, so that the user can hear sound in the way of bone conduction through the facial skin of the user.

In some embodiments, the vibration housing 813 may include a vibration plate 8131, a side plate 8132, and a back plate 8133. In some embodiments, the vibration element 811, the vibration plate 8131, and the second elastic element 815 may be the same or similar to the vibration element 211, the vibration plate 2131, and the second elastic element 215 in the speaker 200, respectively, and the details thereof are not repeated.

In some embodiments, the vibration damping assembly 820 may include a resonance assembly formed by a first elastic element 821 and a mass element 823. The mass element 823 may be elastically connected to the vibration housing 813 (the side plate 8132 of the vibration housing 813) through the first elastic element 821. The vibration housing 813 may transmit the vibrations to the mass element 823 through the first elastic element 821, so that the mechanical vibrations of the vibration housing 813 may be partially absorbed by the mass element 823, thereby reducing the vibration amplitude of the vibration housing 813.

As shown in FIG. 8, the vibration damping assembly 820 may be accommodated in the vibration housing 813 and connected to an inner wall of the side plate 8132 through the first elastic element 821. In some embodiments, the first elastic element 821 may include a diaphragm. Peripheral sides of the diaphragm may be connected to, through a supporting structure, or directly connected to the inside of the side plate 8132 of the vibration housing 813. The side plate 8132 may be a side wall arranged around the vibration plate 8131. When the vibration housing 813 vibrates, the side plate 8132 may cause the diaphragm to vibrate. Since the diaphragm is connected to the vibration housing 813 and vibrates under the driving of the vibration housing 813, it may be called a passive diaphragm. In some embodiments, a type of the diaphragm may include, but is not limited to, a plastic diaphragm, a metal diaphragm, a paper diaphragm, a biological diaphragm, or the like.

In some embodiments, the mass element 823 may be attached to a surface of the diaphragm to form a composite structure together with the diaphragm. The composite structure formed by attaching the mass element 823 to the surface of the diaphragm mainly plays the following roles: (1) the composite structure may be used as a weight element to adjust a mass of the diaphragm system to ensure that an overall mass of the diaphragm system is within a certain range, so that the diaphragm has a relatively large vibration amplitude, thereby effectively weakening the vibration amplitude of the speaker 800 in the low frequency band; (2) the composite structure may have a higher rigidity, so that the surface of the composite diaphragm is not easy to produce high-order modes, thereby avoiding more peaks and valleys in the frequency response of the passive diaphragm.

In some embodiments, the type of the mass element 823 may include, but is not limited to, one or a combination of a paper cone, an aluminum sheet, or a copper sheet. In some embodiments, the mass element 823 may be made of the same material. For example, the composite structure may be a paper cone or an aluminum sheet. In some embodiments, the mass element 823 may be made of different materials. For example, the mass element 823 may be a structure composed of a paper cone and a copper sheet. As another example, the mass element 823 may be a structure formed by mixing aluminum or copper in a certain proportion.

In some embodiments, a way of connecting the mass element 823 to the diaphragm may include, but is not limited to, bonding and fixing with glue, welding, clamping, riveting, a screw connection (cap screw, screw, screw rod, bolt, etc.), an interference connection, a clamp connection, a pin connection, a wedge key connection, an integral molding connection.

In some exemplary application scenarios, the vibrations of the diaphragm may cause the air inside the vibration housing 813 to vibrate. In some embodiments, a sound outlet 840 may be provided on the vibration housing 813 to guide the air vibrations inside the vibration housing 813 to the outside of the vibration housing 813. The guided air vibrations may be transmitted to the user's auditory nerve in a way of air conduction, so that the user can hear sound. In some cases, due to the existence of the vibration damping assembly 820, the mechanical vibration intensity of the vibration plate 8131 may be weakened, thereby resulting in a decrease in a volume of the speaker 800 in the low frequency region. The sound guided out by the sound outlet 840 may enhance the response of the speaker 800 in the low frequency region, so that the speaker 800 may still maintain a certain volume when the low frequency vibration feeling becomes weak.

In some embodiments, the sound outlet 840 may be provided at any position of the vibration housing 813. In some embodiments, the sound outlet 840 may be provided on the side of the vibration housing 813 away from the face of the user, that is, on the back plate 8133. In some embodiments, the sound outlet 840 may be provided on the side plate 8132, for example, a position on the side plate 8132 facing the ear canal of the user. In some other embodiments, the sound outlet 840 may be provided at a corner of the vibration housing 813, for example, a connection position between the side plate 8132 and the back plate 8133. In some embodiments, the sound outlet 840 may include multiple sound outlets 840. The multiple sound outlets 840 may be provided in different positions. For example, a part of the multiple sound outlets 840 may be provided on the back plate 8133, and the other part of the multiple sound outlets 840 may be provided on the side plate 8132. In some embodiments, at least a part of the sound guided through the sound outlet 840 may be guided to the user's ear to improve the low frequency response of the speaker 800. In some embodiments, the above purpose may be achieved by disposing the sound outlets 840 at a position facing the user's ear. For example, when the user wears the speaker 800, the side plate 8132 faces the user's ear, so that the sound outlets 840 may be arranged on the side plate 8132, and the sound may be guided out through the sound outlets 840 and at least a part of the sound may be guided to user's ear. In some embodiments, an additional sound guiding structure may be provided to achieve the above purpose. For example, a sound conduit may be provided at an exit of the sound outlet 840 to guide the sound to a direction of the user's ear through the sound conduit. In some embodiments, the cross-sectional shape of the sound outlet 840 may include, but is not limited to, a circle, a square, a triangle, a polygon, or the like.

In some embodiments, the speaker 800 may further include a fixing assembly 830. The fixing assembly 830 may be fixedly connected to the vibration housing 813 (e.g., the side plate 8132 of the vibration housing 813). The fixing assembly 830 may be configured to keep the speaker 800 in stable contact with the face of the user (e.g., the wearer), thereby avoiding shaking of the speaker 800, and accordingly ensuring that the speaker 800 performs sound transmission stably.

In some embodiments, the smaller rigidity of the fixing assembly 830 (i.e., the smaller a stiffness coefficient), the more obvious the low frequency response of the speaker 800 at the first resonance peak 450 (i.e., the greater a vibration acceleration and the higher a sensitivity of the speaker 800), and the better the sound quality of the speaker 800. In addition, relatively small rigidity (i.e., relatively small stiffness coefficient) of the fixing assembly 83 contributes to reducing the vibrations of the vibration housing 813.

In some embodiments, the fixing assembly 830 may be an ear hook. Both ends of the fixing assembly 830 may be respectively connected to one vibration housing 813 to respectively fix the two vibration housing 813 on both sides of the user's skull by the ear hook. In such cases, the speaker may be a binaural speaker. In some embodiments, the fixing assembly 830 may be a single-ear ear clip. The fixing assembly 830 may be connected to one vibration housing 813, and fix the vibration housing 813 on one side of the user's skull. The structure of the fixing assembly 830 may be the same as or similar to the structures of the fixing assemblies (e.g., the fixing assembly 230) in other embodiments of the present disclosure, which are not repeated.

FIG. 9 is a schematic diagram illustrating a longitudinal section of a speaker in which a mass element is a groove member according to some embodiments illustrating the present disclosure. As shown in FIG. 9, the speaker 900 may include a vibration assembly 910, a vibration damping assembly 920, and a fixing assembly 930. The vibration assembly 910 may include a vibration element 911, a vibration housing 913, and a second elastic element 915. The second elastic element 915 may be configured to elastically connect to the vibration element 911 and the vibration housing 913 to transmit mechanical vibrations of the vibration element 911 to the vibration housing 913. The vibration housing 913 may be in contact with facial skin of a user, and transmit the mechanical vibrations to the user's auditory nerve. The vibration damping assembly 920 may reduce the vibration feeling brought to the user when the vibration housing 913 vibrates. The fixing assembly may be fixedly connected to the resonance assembly 920.

In some embodiments, the vibration element 911, the vibration housing 913, and the second elastic element 915 may be the same as or similar to the vibration element 411, the vibration housing 413, and the second elastic element 415 in the speaker 400 respectively, and the details of their structures are not repeated.

The vibration damping assembly 920 may include a mass element 923 and a first elastic element 921. The mass element 923 may be elastically connected to the vibration housing 913 through the first elastic element 921. As shown in FIG. 9, the vibration damping assembly 920 may be connected to an outer wall of the back plate 9133 through the first elastic element 921. When the vibration housing 913 mechanically vibrates, the resonance assembly formed by the mass element 923 and the first elastic element 921 may absorb part of the mechanical energy of the vibration housing 913, thereby reducing a vibration amplitude of the vibration housing 913.

Different from the speaker 400, the mass element 923 of the vibration damping assembly 920 may be a groove member. The vibration housing 913 may be at least partially accommodated in the groove member. In some embodiments, a cross-sectional shape of the groove of the groove member may be a circular, a square, a polygonal, or the like. In some embodiments, the cross-sectional shape of the groove of the groove member may match an outer contour of the vibration housing 913, so that the vibration housing 913 may be accommodated therein. For example, if the outer contour of the vibration housing 913 is a cuboid, the cross-sectional shape of the groove of the groove member may be a corresponding square shape. In some embodiments, the vibration housing 913 may be fully accommodated in the groove of the groove member. In some embodiments, the vibration housing 913 may be partially accommodated in the groove of the groove member. For example, the vibration plate 9131 of the vibration housing 913 and at least a part of the side plate 9132 of the housing may be located outside the groove, so as to facilitate the contact of the vibration plate 9131 with the facial skin of the user to transmit vibration.

In some embodiments, the first elastic member 921 may include a first part and a second part. The first part of the first elastic element may be connected to the vibration housing. The first part of the first elastic element 921 may be connected to an inner wall of the groove member. For example, in the embodiments shown in FIG. 9, the first part of the first elastic element 921 may be connected to the outer wall of the back plate 9133, and the second part of the first elastic element 921 may be connected to the inner wall of the groove member. As another example, the first part of the first elastic element may be connected to the outer wall of the side plate, and the second part of the first elastic element may be connected to the inner bottom wall of the groove member. In some alternative embodiments, the vibration housing 913 may only include a vibration plate 9131 and a side plate 9132 connected to the vibration plate 9131, and does not include a back plate 9133. In such cases, the mass element 923 may be connected to the inner wall and/or the outer wall of the side plate 9132 through the first elastic element 921.

In some specific embodiments, the first elastic element 921 may be a ring structure, the first part of the first elastic element 921 may be located in a central area of the ring structure, and the second part of the first elastic element 921 may be located in a periphery side of the ring structure. In some alternative embodiments, the first elastic element may be a spring, and two ends of the spring serve as the first part and the second part respectively to connect the vibration housing and the groove member.

In some embodiments, the first elastic element 921 may be directly connected to the back plate 9133 and the groove member. For example, the first elastic element may be connected to the back plate 9133 and the groove member by welding, bonding, integral molding, etc. In some embodiments, the first elastic element 921 may be connected to the back plate 9133 and the groove member through a connector. For example, a third connector may be fixedly arranged on the back plate 9133, and the first part of the first elastic element 921 may be fixedly connected to the third connector. A fourth connector may be fixedly arranged on the groove member, and the second part of the first elastic element 921 may be fixedly connected to the fourth connector.

In some embodiments, an inner dimension of the groove member may be larger than an outer dimension of the vibration housing 913. In such cases, a cavity may be formed between the vibration housing 913 and the groove member. When the vibration housing 913 and the groove member vibrate, the air in the cavity may be driven to vibrate to generate sound. At the same time, a sound channel 940 may be formed between the groove member and the outer wall of the vibration housing 913. For example, in the embodiments shown in FIG. 9, there may be a gap between the side wall of the groove member and the side plate 9132, and the gap may serve as the sound channel 940. The sound generated by the air vibration between the vibration housing 913 and the groove member may be transmitted to the outside through the sound channel 940, and the human ear may partially receive the sound, which has the effect of enhancing the low frequency and increasing the volume to a certain extent.

In some embodiments, the fixing assembly 930 may be configured to maintain the speaker 900 in contact with the user's facial skull. In some embodiments, the fixing assembly 930 may be fixedly connected to the resonance assembly 920. For example, the fixing assembly 930 may be fixedly connected or integrally formed with the mass element 921 (e.g., the groove member). In some embodiments, the fixing assembly 930 may be directly fixedly connected to the groove member. In some embodiments, the fixing assembly 930 may be connected to the groove member through s fixing connector.

In some embodiments, the fixing assembly 930 may be an ear hook. Two ends of the fixing assembly 930 may be respectively connected to one groove member in which one vibration housing 913 is accommodated, and the two groove members may be respectively fixed on both sides of the skull by the ear hook. In some embodiments, the fixing assembly 930 may be a single-ear ear clip. The fixing assembly 930 may be connected to one groove member in which one vibration housing 913 is accommodated, and fix the groove member on one side of the human skull. The structure of the fixing assembly 930 may be the same as or similar to the structures of the fixing assemblies (e.g., the fixing assembly 830) in other embodiments of the present disclosure, which are not repeated.

In some embodiments, more details regarding the resonance frequency of the mass element 923 and the resonance assembly formed by the mass element 923 and the first elastic element 921 may be found in the descriptions of other embodiments in the present disclosure, which are not repeated.

It should be noted that the foregoing one or more embodiments are only for illustration purposes, and not intended to limit the shape or quantity of the speaker 900. After fully understanding the principle of the speaker 900, the speaker 900 may be deformed to obtain the speaker 900 different from the embodiments of the present disclosure. For example, a shape of the mass element may be changed. As another example, the material of the first elastic element 921 may be adjusted, so that the first elastic element 921 may have a stronger vibration absorption effect. In some embodiments, the first elastic element 921 may further be foam or glue. For example, the first elastic element 921 may be glue coated on the outer wall of the back plate 9133, and the groove member may be adhered to the vibration housing 913 through the glue. In some embodiments, the glue may have a certain damping, so as to be able to further absorb the vibration energy of the vibration housing 913 and reduce the vibration amplitude.

Figure 10:
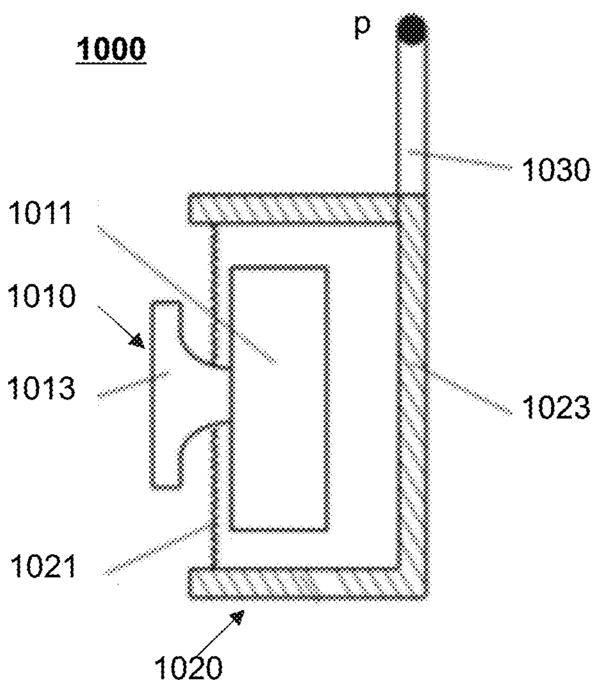
FIG. 10 is a schematic diagram illustrating a longitudinal section of a speaker with a vibration damping assembly according to some embodiments of the present disclosure.
Figure 11:
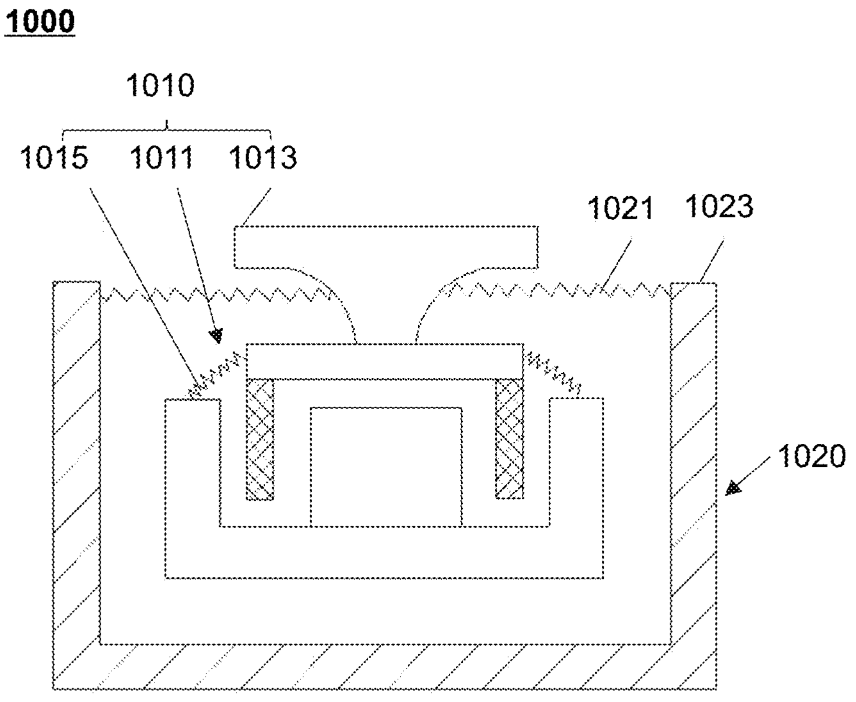
FIG. 11 is a schematic diagram illustrating a longitudinal section of the speaker shown in FIG. 10 at another angle.

FIG. 10 is a schematic diagram illustrating a longitudinal section of a speaker with a vibration damping assembly according to some embodiments of the present disclosure. FIG. 11 is a schematic diagram illustrating a longitudinal section of the speaker shown in FIG. 10 at another angle. As shown in FIG. 10 and FIG. 11, the speaker 1000 may include a vibration assembly 1010, a vibration damping assembly 1020, and a fixing assembly 1030. The vibration assembly 1010 may include a vibration element 1011, a vibration housing 1013, and a second elastic element 1015 (as shown in FIG. 11). The second elastic element 1015 may be configured to elastically connect the vibration element 1011 and the vibration housing 1013. In some embodiments, the vibration element 1011, the second elastic element 1015, and the fixing assembly 1030 may be the same as or similar to the vibration element 411, the second elastic element 415, and the fixing assembly 430 in the speaker 400, respectively, and details of their structures are not repeated.

Different from the speakers (e.g., the speaker 400) in the foregoing embodiments, the vibration housing 1013 may be a separate plate-shaped or plate-like structure, which directly contacts facial skin of a user to transmit vibration, so the vibration housing 1013 may be equivalent to the vibration plate in the foregoing embodiments. The vibration housing 1013 does not define an accommodation space, and the vibration element 1011 and the second elastic element 1015 may be directly connected to the vibration housing 1013. The mass element 1023 may be a groove member, and the groove of the mass element 1023 may be used as an accommodation space, and at least a part of the vibration assembly 1010 may be accommodated in the space formed by the mass element 1023. The first elastic element 1021 may connect the mass element 1023 with the vibration housing 1013.

As shown in FIG. 11, the vibration element 1011 may include a magnetic circuit assembly. A coil may be arranged on the vibration housing 1013, and the magnetic circuit assembly may be arranged around the coil. The second elastic element 1015 may connect the magnetic circuit assembly and the vibration housing 1013.

In some embodiments, the second elastic element 1015 may be a vibration transmission sheet. In some embodiments, the vibration transmission sheet may be a ring structure. As shown in FIG. 11, the vibration transmission sheet with the ring structure may be arranged around outside of the vibration housing 1013, a peripheral side of the vibration transmission sheet with the ring structure may be connected to the magnetic circuit assembly, and a middle part of the vibration transmission sheet with the ring structure may be connected to the vibration housing 1013. When mechanical vibrations occur due to an action of Ampere force, the vibration housing 1013 may transmit the vibrations to the mass element 1023 through the first elastic element 1021 to cause the mass element 1023 to vibrate, thereby finally realizing the effect of weakening the vibration amplitude of the vibration assembly 1010. More descriptions regarding the vibration transmission plate may be found in FIG. 2 and its related descriptions.

In some cases, after the speaker is improved as described in the foregoing embodiments, not only the frequency response range of the speaker may be widened, especially the low frequency response range of the speaker may be widened, but also a magnitude of the low frequency resonance peak generated by the speaker in the low frequency region is significantly reduced, which reduces the vibration feeling felt by the skin when the user wears the speaker, thereby effectively improving the user experience.

In addition, the speaker may produce a sound leakage during the working process. The sound leakage may refer to that during the working process of the speaker, the vibrations of the speaker may produce sound transmitted to a surrounding environment, and in addition to the wearer of the speaker, other people in the environment may hear the sound from the speaker. There are many reasons for the sound leakage phenomenon, including that the vibrations of the vibration element (e.g., the transducer) are transmitted to the vibration housing through the second elastic element and cause the vibration housing to vibrate; that the vibrations of the vibration plate are transmitted to the vibration housing through the connector and cause the vibration housing to vibrate; or that the vibrations of the vibration element cause the air in the vibration housing to vibrate, and the sound generated by the air vibration is exported out of the housing through a sound outlet provided on the housing.

It should be noted that the sound leakage of the speaker may be related to the mechanical vibrations of the vibration housing. In some cases, the greater the mechanical vibration intensity of the vibration housing is, the more serious the sound leakage of the speaker is. The smaller the mechanical vibration intensity of the vibration housing is, the weaker the sound leakage of the speaker is. Therefore, in one or more of the foregoing embodiments, when the mechanical vibration intensity of the vibration housing is reduced through the vibration damping assembly, the sound leakage of the speaker may be reduced. In some embodiments, the vibration intensity of the vibration housing may be reduced by the vibration damping assembly, thereby weakening the sound leakage of the speaker. The vibration damping assembly may be the same as or similar to that described in one or more of the foregoing embodiments. In some embodiments, the vibration damping assembly may include a first elastic element, which has a certain damping, so that the first elastic element may absorb the mechanical energy of the vibration housing (e.g., the side plate and the back plate), thereby reducing the vibration intensity of the housing and weakening the sound leakage of the speaker. In some embodiments, the vibration damping assembly may include a first elastic element and a mass element, and the mechanical vibrations may be transmitted to the mass element through the first elastic element to cause the mass element to vibrate to absorb the mechanical energy of the vibration housing.

Figure 12:
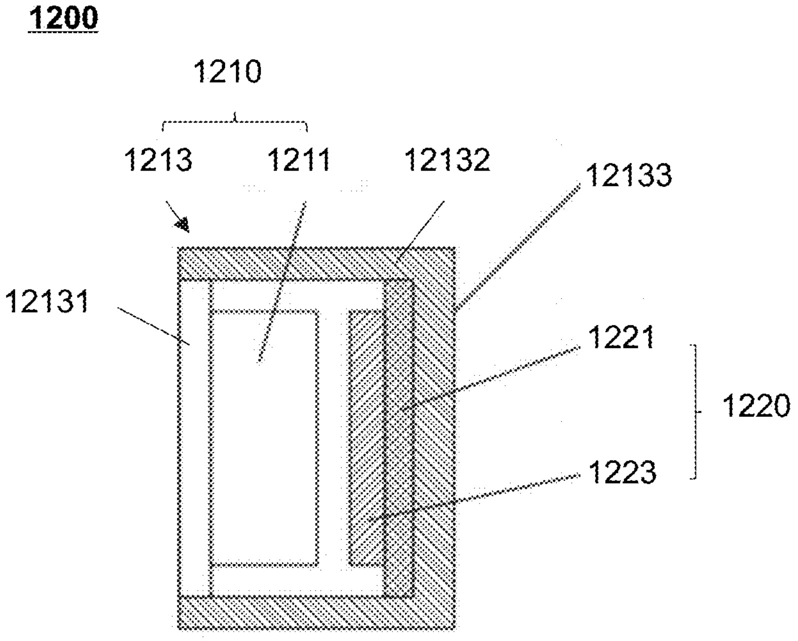
FIG. 12 is a schematic diagram illustrating a longitudinal section of a speaker in which a vibration damping assembly is arranged in a vibration housing according to some embodiments of the present disclosure.

FIG. 12 is a schematic diagram illustrating a longitudinal section of a speaker in which a vibration damping assembly is arranged in a vibration housing according to some embodiments of the present disclosure. As shown in FIG. 12, the speaker may include a vibration assembly 1210 and a vibration damping assembly 1220. The vibration assembly 1210 may include a vibration element 1211 and a vibration housing 1213 connected to the vibration element 1211. The vibration element 1211 may generate mechanical vibrations and transmit the mechanical vibrations to the vibration housing 1213, so that the vibration housing 1213 may vibrate. The vibration housing 1213 may be in contact with facial skin of a user to transmit the vibrations to the user's auditory nerve in a way of bone conduction.

As shown in FIG. 12, the vibration housing 1213 may include a vibration plate 12131, a side plate 12132, and a back plate 12133. The back plate 12133 may be opposite to the vibration plate 12131, and the side plate 12132 may be connected between the back plate 12133 and the vibration plate 12131. The vibration plate 12131 may be in contact with the facial skin of the user.

In some embodiments, the vibration plate 12131 and the side plate 12132 may be directly connected by, for example, bonding, welding, riveting, nailing, integral molding, or the like. In some other embodiments, the vibration plate 12131 and the side plate 12132 may be connected by a connector. In some embodiments, the vibration plate 12131 and the side plate 12132 may be elastically connected to reduce the mechanical vibration intensity transmitted to the side plate 12132 and the back plate 12133, thereby reducing the sound leakage caused by the vibrations of the side plate 12132 and the back plate 12133. In some other embodiments, the vibration plate 12131 and the side plate 12132 may be rigidly connected. In the embodiments, since the vibration element 1211 is directly connected to the vibration plate 12131, the mechanical vibrations generated by the vibration element 1211 may be directly transmitted to the user through the vibration plate 12131. Therefore, the vibration plate 12131 and the side plate 12132 may be elastically connected to reduce the mechanical energy received by the side plate 12132 and the back plate 12133, thereby reducing the sound leakage caused by the vibrations of the side plate 12132 and the back plate 12133.

In the embodiments, the vibration element 1211 may be connected to the vibration plate 12131, and transmit the mechanical vibrations to the vibration plate 12131. The vibration plate 12131 may transmit the mechanical vibrations to the side plate 12132 and the back plate 12133 to cause both to vibrate. Therefore, the vibration housing 1213 may continue to vibrate during a working process of the speaker 1200, and the vibrations of the vibration housing 1213 may cause the air to vibrate, thereby resulting in a sound leakage.

The vibration damping assembly 1220 may include a first elastic element 1221 and a mass element 1223. The mass element 1223 may be connected to the side plate 12132 and the back plate 12133 through the first elastic element 1221. Similar to the foregoing embodiments, when the vibration housing 1213 vibrates, the mechanical vibrations of the vibration housing 1213 may be transmitted to the mass element 1223 through the first elastic element 1221, thereby causing the mass element 1223 to vibrate. The vibration damping assembly 1220 may absorb the mechanical energy of the vibration housing 1213 (mainly the back plate 12133 and the side plate 12132) in a specific frequency band, thereby reducing the vibration amplitudes of the vibrations housing 1213 and reducing the sound leakage caused by the vibrations. A range of the specific frequency band may be related to factors such as an elastic coefficient and a mass of the resonance assembly formed by the first elastic element 1221 and the mass element 1223. By changing the elastic coefficient of the resonance assembly and the mass of the resonance assembly, the range of the frequency band in which the resonance assembly absorbs vibrations may be adjusted.

In some embodiments, the range of the frequency band in which the resonance assembly absorbs vibrations may be adjusted by adjusting a type, hardness, and thickness of the first elastic element 1221, and a bonding area between the first elastic element 1221 and the vibration housing 1213, etc.

Taking glue as the first elastic element as an example. In some embodiments, a shore hardness of the glue may be in a range of 10-80. In some embodiments, the shore hardness of the glue may be in a range of 20-60. In some embodiments, the shore hardness of the glue may be in a range of 25-55. In some embodiments, the shore hardness of the glue may be in a range of 30-50.

After the glue is coated on the inner wall of the back plate 12133, a glue layer may be formed. In some embodiments, a thickness of the glue layer may be in a range of 10 μm-200 μm. In some embodiments, the thickness of the glue layer may be in a range of 20 μm-190 μm. In some embodiments, the thickness of the glue layer may be in a range of 30 μm-180 μm. In some embodiments, the thickness of the glue layer may be in a range of 40 μm-160 μm. In some embodiments, the thickness of the glue layer may be in a range of 50 μm-150 μm.

In some embodiments, a bonding area between the glue layer and the inner wall of the back plate 12133 may account for 1%-98% of a surface area of the inner wall of the back plate 12133. In some embodiments, the bonding area between the glue layer and the inner wall of the back plate 12133 may account for 5%-90% of a surface area of the inner wall of the back plate 12133. In some embodiments, the bonding area between the glue layer and the inner wall of the back plate 12133 may account for 10%-60% of a surface area of the inner wall of the back plate 12133. In some embodiments, the bonding area between the glue layer and the inner wall of the back plate 12133 may account for 20%-40% of a surface area of the inner wall of the back plate 12133. In some embodiments, the bonding area between the glue layer and the inner wall of the back plate 12133 may be in a range of 10 $mm^2$-200 $mm^2$. In some embodiments, the bonding area between the glue layer and the inner wall of the back plate 12133 may be in a range of 20 $mm^2$-190 $mm^2$. In some embodiments, the bonding area between the glue layer and the inner wall of the back plate 12133 may be in a range of 30 $mm^2$-180 $mm^2$. In some embodiments, the bonding area between the glue layer and the inner wall of the back plate 12133 may be in a range of 40 $mm^2$-170 $mm^2$. In some embodiments, the bonding area between the glue layer and the inner wall of the back plate 12133 may be in a range of 50 $mm^2$-150 $mm^2$. In some specific embodiments, the bonding area between the glue layer and the inner wall of the back plate 12133 may be 10 $mm^2$.

Figure 13:
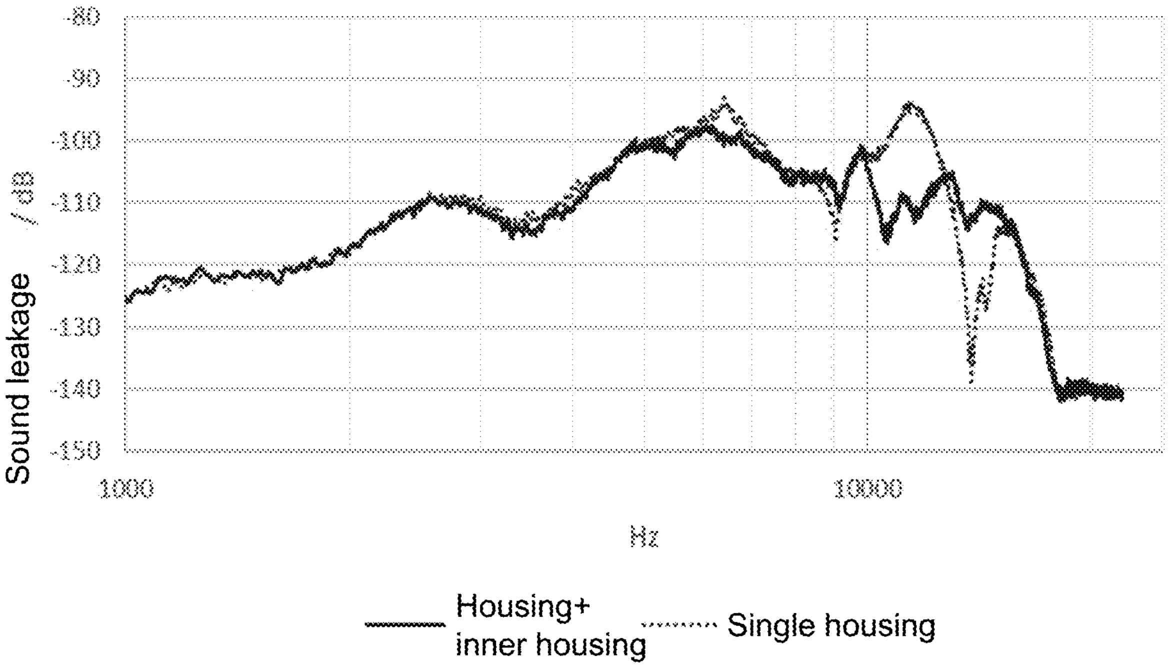
FIG. 13 is a schematic diagram illustrating sound leakage intensity curves of speakers according to some embodiments of the present disclosure.

FIG. 13 is a schematic diagram illustrating sound leakage intensity curves of speakers according to some embodiments of the present disclosure. The FIG. 13 respectively shows a sound leakage intensity curve (i.e., a dotted line in the figure) of the speaker 200 without a vibration damping assembly and a sound leakage intensity curve (i.e., a solid line in the figure) of the speaker 1200 with the vibration damping assembly 1220. In some embodiments, the vibration damping assembly may only include a mass element. The mass element may be an inner housing arranged inside the vibration housing (i.e., the housing in FIG. 13). It may be known from FIG. 13 that under the influence of the vibration damping assembly 1220, the sound leakage intensity of the speaker 1200 around 10000 Hz (e.g., within a range of 10000 Hz-10300 Hz) is significantly reduced. In the embodiments, the first elastic element 1221 of the vibration damping assembly 1220 may be glue with a shore hardness of 30-50. A thickness of the glue layer formed on an inner wall of the back plate 12133 may be in a range of 50 μm-150 μm. A bonding area between the glue layer and the inner wall of the back plate 12133 may be 150 $mm^2$.

In addition to reducing the sound leakage of the speaker 1200 in a high frequency area (e.g., 10000 Hz-10300 Hz), the vibration damping assembly 1220 of the present disclosure may further reduce the sound leakage of the speaker 1200 in other frequency bands. In some embodiments, the foam may be selected as the first elastic element 1221, and the elasticity and damping may be changed by adjusting the thickness of the foam, so as to control the frequency band of reducing the sound leakage in the middle and low frequency regions. In some embodiments, the thickness of the foam may be in a range of 0.3 mm-2 mm. In some embodiments, the thickness of the foam may be in a range of 0.4 mm-1.9 mm. In some embodiments, the thickness of the foam may be in a range of 0.5 mm-1.8 mm. In some embodiments, the thickness of the foam may be in a range of 0.6 mm-1.8 mm.

Figure 14:
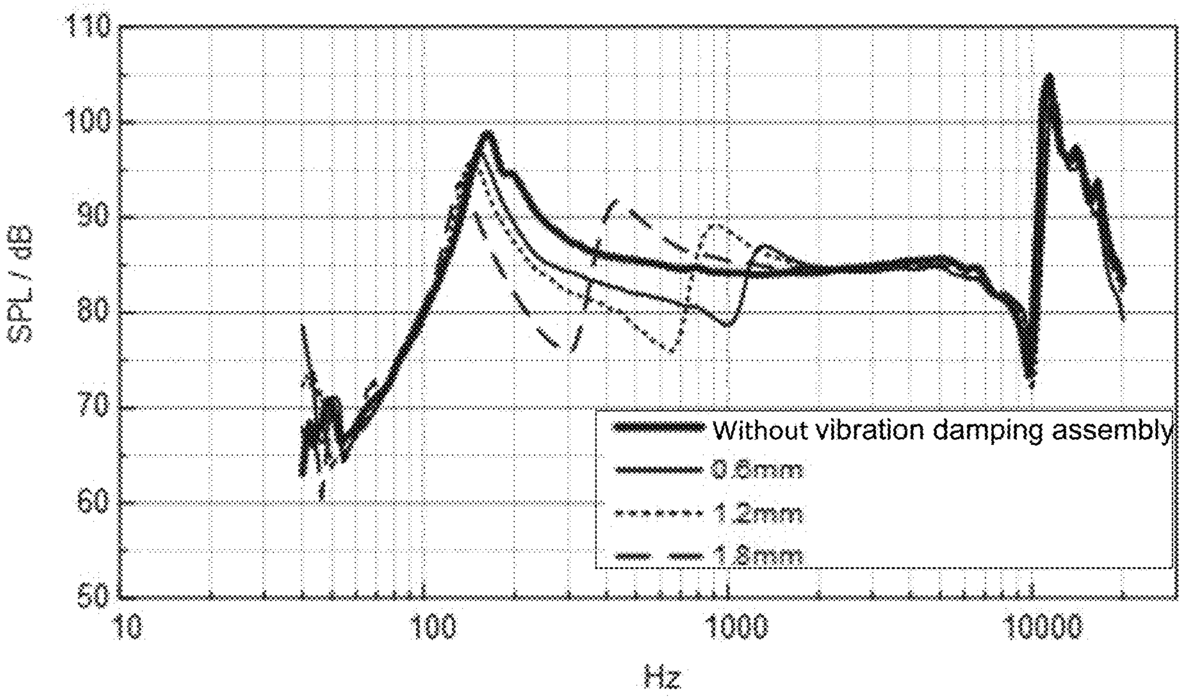
FIG. 14 is a schematic diagram illustrating sound pressure level curves of speakers according to some embodiments of the present disclosure.

FIG. 14 is a schematic diagram illustrating sound pressure level curves of speakers according to some embodiments of the present disclosure. FIG. 14 respectively shows a sound pressure level curve of the speaker 1200 with a damping assembly 1220 using foam with a thickness of 0.6 mm as the first elastic element 1221, a sound pressure level curve of the speaker 1200 with a damping assembly 1220 using foam with a thickness of 1.2 mm as the first elastic element 1221, a sound pressure level curve of the speaker 1200 with a damping assembly 1220 using foam with a thickness of 1.8 mm as the first elastic element 1221, and a sound pressure level curve of the speaker 200 without a vibration damping assembly 1220. The ordinate SPL (Sound Pressure Level) may represent the sound pressure level, and the sound pressure level may be equivalent to a mechanical vibration intensity of the speaker 1200, that is, the larger a value of the ordinate in the graph is, the greater the mechanical vibration intensity of the speaker 1200 is. Due to the mechanical vibrations of the speaker 1200 mainly coming from the vibration of the vibration housing 1213, the value of the ordinate may represent the mechanical vibration intensity of the vibration housing 1213.

As shown in FIG. 14, compared with the speaker 1200 without a resonance assembly (in the embodiments shown in FIG. 12, the damping assembly 1220 may be equivalent to a resonance assembly), the vibration intensity of the speaker 1200 in a specific frequency band may be reduced by adding foam with the thicknesses of 0.6 mm, 1.2 mm, and 1.8 mm respectively as the first elastic element 1221 of the resonance assembly. For example, when the thickness of the foam of the vibration damping assembly 1220 of the speaker 1200 is 0.6 mm, the vibration intensity of the speaker 1200 is reduced in a frequency range of about 180 Hz-1010 Hz, and a valley appears at a frequency of about 1000 Hz (the vibration intensity is the smallest in a frequency range of 180 Hz-1010 Hz). As another example, when the thickness of the foam of the vibration damping assembly 1220 of the speaker 1200 is 1.2 mm, the vibration intensity of the speaker 1200 is reduced in a frequency range of about 170 Hz-750 Hz, and a valley appears at a frequency of about 650 Hz (the vibration intensity is the smallest in a frequency range of 170 Hz-750 Hz). As a further example, when the thickness of the foam of the vibration damping assembly 1220 of the speaker 1200 is 1.8 mm, the vibration intensity of the speaker 1200 is reduced in a frequency range of about 160 Hz-350 Hz, and a valley appears at a frequency of about 300 Hz (the vibration intensity is the smallest in a frequency range of 160 Hz-350 Hz). Due to the vibration intensity being reduced, the sound leakage generated by the speaker 1200 during the working process is weakened.

It should be noted that the foregoing one or more embodiments are only for illustration purposes, and not intended to limit the shape or quantity of the speaker 1200. After fully understanding the sound leakage reduction principle of the speaker 1200, the speaker 1200 may be deformed to obtain a speaker 1200 different from the embodiments of the present disclosure. For example, the vibration damping assembly 1220 may be modified with reference to the previous embodiments. In some embodiments, the vibration damping assembly 1220 may only include the first elastic element 1221, and not include the mass element 1223. For example, the first elastic element 1221 may have a certain damping, so as to be able to absorb and dissipate the vibration energy of the vibrating housing 1213 (e.g., the back plate 12133 and the side plate 12132 of vibration housing 1213) connected to the first elastic element 1221, thereby achieving the purpose of reducing sound leakage.

Figure 15:
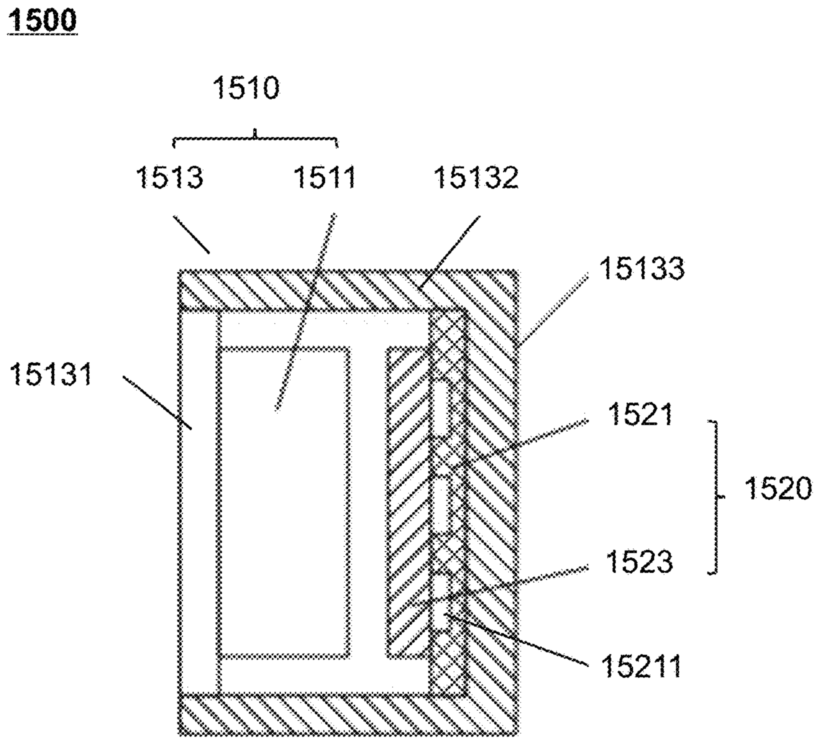
FIG. 15 is a schematic diagram illustrating a longitudinal section of a speaker in which a first elastic element has a hole according to some embodiments of the present disclosure.

FIG. 15 is a schematic diagram illustrating a longitudinal section of a speaker in which a first elastic element has a hole according to some embodiments of the present disclosure. As shown in FIG. 15, the speaker 1500 may include a vibration assembly 1510 and a vibration damping assembly 1520. The vibration assembly 1510 may include a vibration element 1511 (e.g., a transducer) that generates mechanical vibrations and a vibration housing 1513 that contacts facial skin of a user. The vibration damping assembly 1520 may be connected to the vibration housing 1513 to absorb the mechanical energy of the vibration housing 1513, thereby reducing the vibration amplitude of the vibration housing 1513, and accordingly finally reducing the sound leakage caused by the vibrations of the vibration housing 1513. In some embodiments, the vibration housing 1513 (including the side plate 15132, the back plate 15133, and the housing plate 15131) in the speaker 1500, the vibration element 1511, the mass element 1523 may be respectively the same as or similar to the vibration housing 1213 (including the side plate 12132, the back plate 12133, and the housing plate 12131) in the speaker 1200, the vibration element 1211, and the mass element 1223, which are not repeated herein.

Different from the speaker 1200, the first elastic element 1521 and the mass element 1523 of the speaker 1500 may be an incomplete connection. The incomplete connection may refer to that there may be an empty space on the contact surface between the mass element 1523 and the first elastic element 1521, or fillers may be provided in the first elastic element 1521. In some embodiments, the first elastic element 1521 may have a hole 15211 on a side away from the back plate 15133. Due to the existence of the hole 15211, when the mass element 1523 is connected to the first elastic element 1521, there may be an empty space on the contact surface between the mass element 1523 and the first elastic element 1521. In some cases, the hole 15211 in the first elastic element 1521 may reduce the elasticity of the first elastic element 1521, so that the first elastic element 1521 may still provide a sufficiently low elasticity when the thickness is relatively thin, and the resonance frequency of the resonance assembly formed by the first elastic element 1521 and the mass element 1523 may be easily adjusted to the required frequency band. In some alternative embodiments, the hole 15211 may be arranged inside the first elastic member 1521. In some other embodiments, the hole 15211 may be provided on the surface and inside of the first elastic element 1521. In some embodiments, the hole 15211 may be formed by cutting a hole in the first elastic member 1521.

For example, the first elastic element 1521 may be plastic, and the hole 15211 may be formed by cutting the hole on the surface and/or inside of the plastic. In some other embodiments, the hole 15211 may be a structure of the first elastic element 1521 itself. For example, the first elastic element 1521 may be foam, and the foam may have a hole structure, and the hole structure may directly serve as the hole 15211. In some embodiments, a filler may be arranged in the hole 15211. Exemplary filler may be a damping filler, such as a damping glue, a damping grease, or the like. In some cases, the arrangement of the damping filler in the hole 15211 may increase the damping of the first elastic element 1521. When the speaker 1500 is working, the first elastic element 1521 may dissipate the vibration energy of the vibration housing 15133, thereby reducing the vibration amplitude of the vibration housing 15133, and accordingly reducing the sound leakage.

Figure 16:
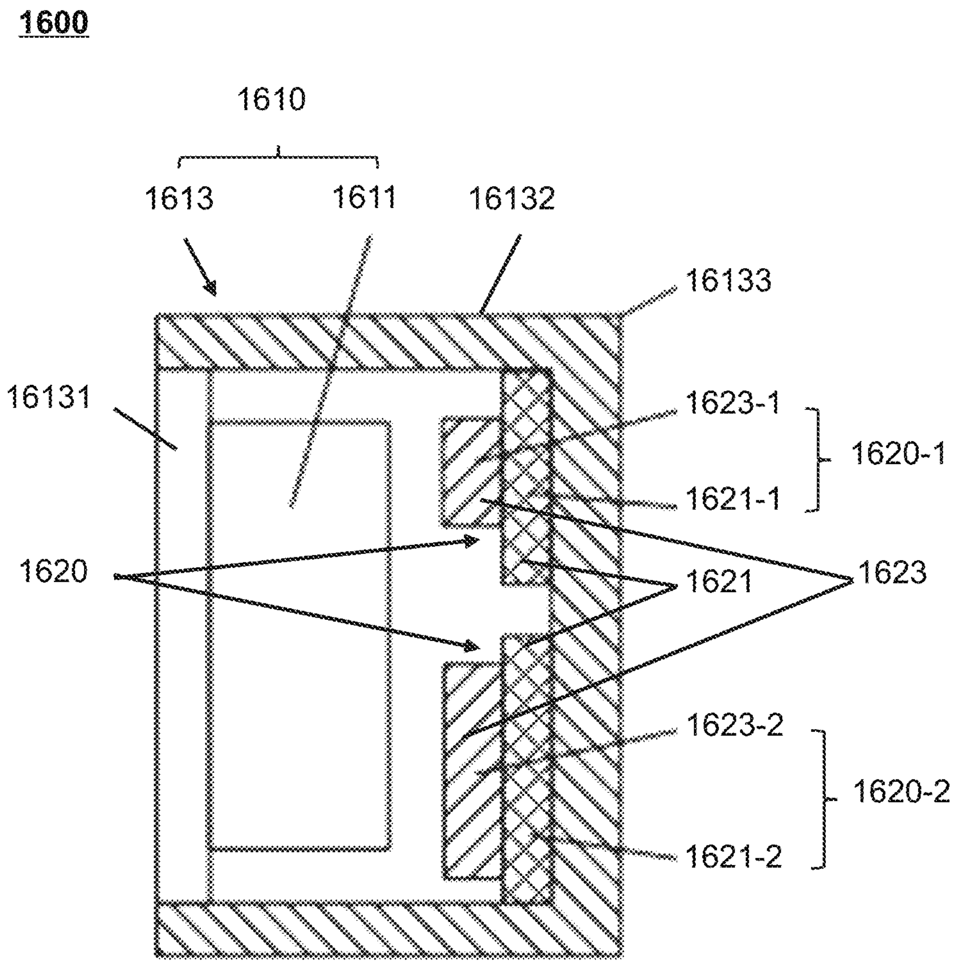
FIG. 16 is a schematic diagram illustrating a longitudinal section of a speaker including two resonance assemblies according to some embodiments illustrating the present disclosure.

FIG. 16 is a schematic diagram illustrating a longitudinal section of a speaker including two resonance assemblies according to some embodiments illustrating the present disclosure. As shown in FIG. 16, the speaker 1600 may include a vibration assembly 1610 and vibration damping assemblies 1620. The vibration assembly 1610 may include a vibration element 1611 (e.g., a transducer) that generates mechanical vibrations and a vibration housing 1613 that contacts facial skin of a user. The vibration damping assemblies 1620 may be connected to the vibration housing 1613 to absorb the mechanical energy of the vibration housing, thereby reducing the vibration amplitude of the vibration housing 1613, and accordingly finally reducing a sound leakage caused by the vibrations of the vibration housing 1613. In some embodiments, the vibration housing 1613 (including a side plate 16132, a back plate 16133, and a housing plate 16131) in the speaker 1600, the vibration element 1611, a first elastic element 1621, a mass element 1623 may be the same as or similar to the vibration housing 1213 (including the side plate 12132, the back plate 12133, and housing plate 12131), the vibration element 1211, the first elastic element 1221, and the mass element 1223 in the speaker 1200, which are not repeated herein.

Different from the speaker 1200 shown in FIG. 12, the vibration damping assemblies 1620 of the speaker 1600 may include two resonance assemblies. For the convenience of description, a resonance assembly arranged on an upper side of an inner wall of the back plate 16133 may be a first resonance assembly 1620-1, and a resonance assembly arranged on a lower side of the inner wall of the back plate 16133 may be a second resonance assembly 1620 -2. A mass element in each of the resonance assemblies may be connected to the inner wall of the back plate through a first elastic element. A first elastic element 1621-1 of the first resonance assembly 1620-1 may be connected to the inner wall of the back plate 16133 and an upper side plate 16132. A first elastic element 1621-2 of the second resonance assembly 1620-2 may be connected to the inner wall of the back plate 16133 and a lower side plate 16132. As shown in FIG. 16, the first elastic elements of the two resonance assemblies may be all made of the same material and have the same thickness. For example, the two resonance assemblies use glue as the first elastic elements, and thicknesses of glue layers formed by coating the glue on the inner wall of the back plate may be the same or similar. In some alternative embodiments, the first elastic elements of the two resonance assemblies may be made of different materials, or have different thicknesses. For example, the first elastic element 1621-1 of the first resonance assembly 1620-1 may be foam, and the first elastic element 1621-2 of the second resonance assembly 1620-2 may be glue.

As shown in FIG. 16, the first resonance assembly 1620-1 and the second resonance assembly 1620-2 may be separated by a preset distance. For example, edges of the first elastic elements 1621 of the two resonance assemblies may be separated by the preset distance. The preset distance may be arranged according to actual needs.

The first resonance assembly 1620-1 and the second resonance assembly 1620-2 may not be limited to the way of arrangement and arrangement position in FIG. 16. In some embodiments, the first resonance assembly 1620-1 and the second resonance assembly 1620-2 may be arranged on any area of the inner wall of the back plate 16133. The inner wall of the back plate 16133 may include an edge area and a central area. The edge area may refer to an area proximate to the side plate 16132 of the housing. In some embodiments, the first resonance assembly 1620-1 and the second resonance assembly 1620-2 may be arranged in the edge area. For example, in FIG. 16, the first elastic elements of the two resonance assemblies may be connected to the side plate 16132. In some other embodiments, the first resonance assembly 1620-1 and the second resonance assembly 1620-2 may be arranged in the central area. For example, the first elastic elements of the two resonance assemblies may be not connected to the side plate 16132, and may be separated from the side plate 16132 by a preset distance threshold. The preset distance threshold may be arranged according to actual needs. In some alternative embodiments, the first resonance assembly 1620-1 and the second resonance assembly 1620-2 may be arranged in the edge area and the central area, respectively. For example, the first resonance assembly 1620-1 may be arranged in the edge area, and the first elastic element 1621-1 may be connected to the upper side plate 16132. The second resonance assembly 1620-2 may be arranged in the central area, and the first elastic unit 1621-2 may be only connected to the inner wall of the back plate 16133. As another example, the first resonance assembly 1620-1 may be arranged at an edge area and form a ring structure around the entire back plate 16133, so as to enclose the second resonance assembly 1620-2. For example, a circle formed by foam may be arranged around the edge area of the back plate 16133 as the first elastic element 1621-1, and then a ring-shaped mass element 1623-1 corresponding to the shape of the foam may be connected to the foam. The first elastic element 1621-2 and the mass element 1623-2 of the second resonance assembly 1620-2 may be arranged in the central area.

As described in the foregoing embodiments, the resonance frequency of the first resonance assembly 1620-1 and the resonance frequency of the second resonance assembly 1620-2 may be the same or different. When the resonance frequency of the first resonance assembly 1620-1 is different from the resonance frequency of the second resonance assembly 1620-2, a vibration reduction effect may be generated in a frequency band near their respective resonance frequencies, thereby broadening the frequency band of vibration absorption. When the resonance frequency of the first resonance assembly 1620-1 is the same as the resonance frequency of the second resonance assembly 1620-2, the vibration reduction effect of the frequency band near the resonance frequency may be further enhanced.

Figure 17:
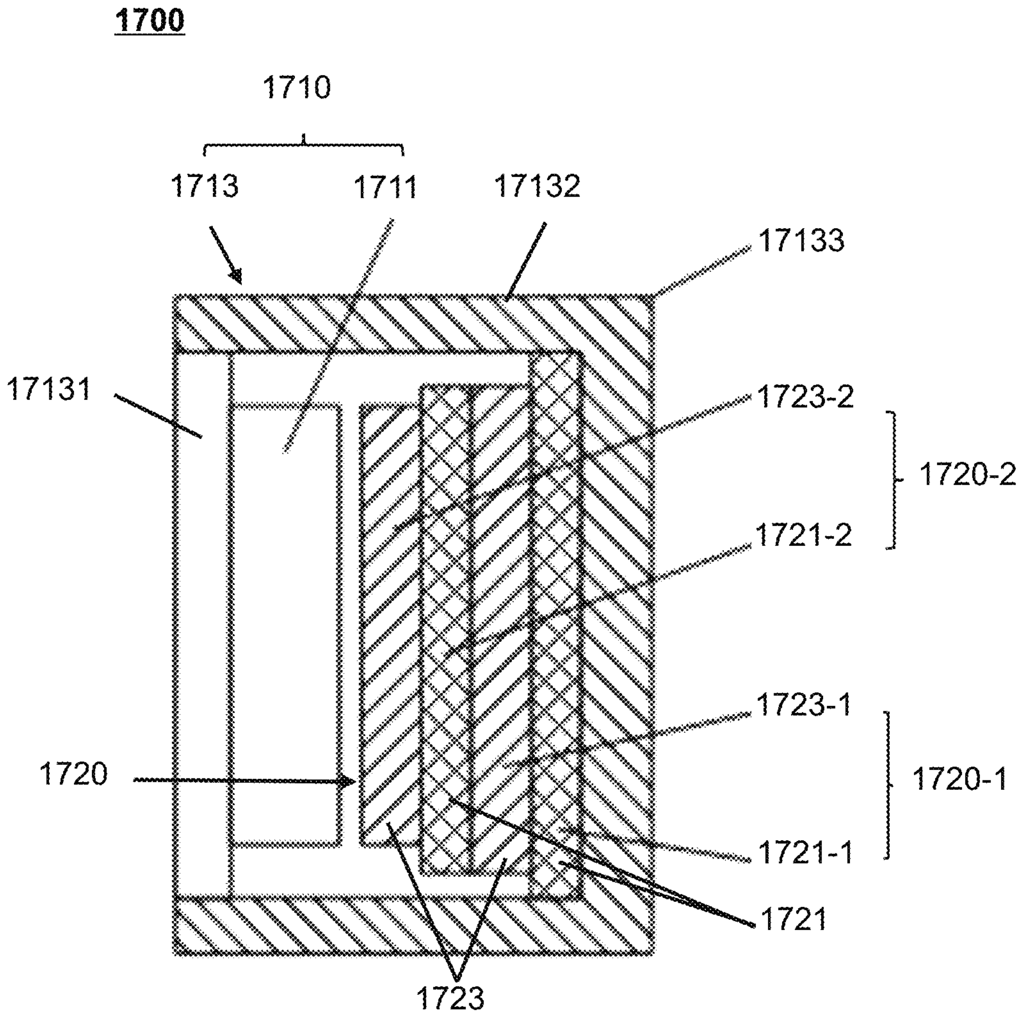
FIG. 17 is a schematic diagram illustrating a longitudinal section of a speaker including two resonance assemblies according to some embodiments of the present disclosure.

FIG. 17 is a schematic diagram illustrating a longitudinal section of a speaker including two resonance assemblies according to some embodiments of the present disclosure. As shown in FIG. 17, the speaker 1700 may include a vibration assembly 1710 and a vibration damping assembly 1720. The vibration assembly 1710 may include a vibration element 1711 (e.g., a transducer) that generates mechanical vibrations and a vibration housing 1713 that contacts facial skin of a user. The vibration damping assembly 1720 may be connected to the vibration housing 1713 to absorb the mechanical energy of the vibration housing 1713, thereby reducing the vibration amplitude of the vibration housing 1713, and accordingly finally weakening a sound leakage caused by the vibrations of the vibration housing 1713. In some embodiments, the vibration housing 1713 in the speaker 1700 (including a housing plate 17131, a side plate 17132, and a back plate 17133), the vibration element 1711, the first elastic element (e.g., a first elastic element 1721-1, a first elastic element 1721-2), the mass element (e.g., a mass element 1723-1, a mass element 1723-2) may be the same as or similar to the vibration housing 1613 in the speaker 1600 (including the housing plate 16131, the side plate 16132, and back plate 16133), the vibration element 1611, the first elastic element (e.g., the first elastic element 1621-1, the first elastic element 1621-2), the mass element (e.g., the mass element 1623-1, the mass element 1623 -2), which are not repeated herein.

Different from the speaker 1600 shown in FIG. 16, two resonance assemblies (e.g., a first resonance assembly 1720-1 and a second resonance assembly 1720-2) of the speaker 1700 may be not directly connected to the vibration housing 1713, but may be connected in a way of stacking. For example, one side of the first elastic element 1721-1 of the first resonance assembly 1720-1 may be connected to an inner wall of the vibration housing 1713, and an edge of the first elastic element 1721-1 may be connected to the side plate 17132. The mass element 1723-1 may be connected to the other side of the first elastic element 1721-1. One side of the first elastic element 1721-2 of the second resonance assembly 1720-2 may be connected to a side of the mass element 1723-1 of the first resonance assembly 1720-1 away from the back plate 17133, and the edge of the elastic element may be not connected to the side plate 17132, and the other side may be connected with the mass element 1723-2. In some embodiments, during actual manufacture, glue (as the first elastic element 1721-1 of the first resonance assembly 1720-1) may be coated on the inner wall of the back plate 17133, and the glue may cover the inner wall of the back plate 17133, and the mass element 1723-1 may be bonded on the surface of the glue. Further, glue (as the first elastic element 1721-2 of the second resonance assembly 1720-2) may be coated on a side of the mass element 1723-1 away from the back plate 17133, and another mass element 1723-2 may be bonded on the surface of the glue.

In some cases, when at least two resonance assemblies are connected in series in a laminated manner, a complex resonance system may be formed, which may have multiple resonance modes, that is, have multiple resonance frequencies. At the resonance frequencies, the resonance system may absorb the vibration energy of the vibration housing 1713, thereby reducing a sound leakage caused by the vibrations of the vibration housing 1713.

Having thus described the basic concepts, it may be rather apparent to those skilled in the art after reading this detailed disclosure that the foregoing detailed disclosure is intended to be presented by way of example only and isn't limiting. Various alterations, improvements, and modifications may occur and are intended for those skilled in the art, though not expressly stated herein. These alterations, improvements, and modifications are intended to be suggested by this disclosure and are within the spirit and scope of the exemplary embodiments of this disclosure.

Moreover, certain terminology has been configured to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment," "one embodiment," or "an alternative embodiment" in various portions of the present disclosure are not necessarily all referring to the same embodiment. Furthermore, the particular features, structures, or features may be combined as suitable in one or more embodiments of the present disclosure.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various embodiments. This method of disclosure, however, isn't to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties configured to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A speaker, comprising:

a vibration assembly including a vibration element and a vibration housing, wherein the vibration element converts an electrical signal into a mechanical vibration, and the vibration housing is in contact with facial skin of a user;

a first elastic element elastically connected to the vibration housing; and a mass element connected to the vibration housing through the first elastic element, the mass element being connected to the first elastic element to form a resonance assembly, wherein the vibration housing comprises a vibration plate and a back plate arranged opposite to the vibration plate, the vibration plate being in contact with the facial skin of the user, the mass element is connected to the back plate through the first elastic element, and the first elastic element is arranged on a surface of the back plate, a contact area between the first elastic element and the back plate being greater than 10 $mm^2$.

2. The speaker of claim 1, wherein a mass ratio of the mass element to the vibration plate is in a range of 0.04-1.25.

3. The speaker of claim 1, wherein the vibration assembly forms a first resonance peak at a first frequency, the resonance assembly forms a second resonance peak at a second frequency, and a ratio of the second frequency to the first frequency is in a range of 0.5-2.

4. The speaker of claim 3, wherein the first frequency and the second frequency are less than 500 Hz.

5. The speaker of claim 4, wherein in a frequency range less than the first frequency, a vibration amplitude of the resonance assembly is greater than a vibration amplitude of the vibration housing.

6. The speaker of claim 1, wherein the first elastic element comprises at least one of silica gel, plastic, glue, foam, or spring.

7. The speaker of claim 6, wherein a shore hardness of the glue is in a range of 30-50, a tensile strength of the glue is not less than 1 MPa, an elongation at break of the glue is in a range of 100%-500%, a bonding strength between the glue and the back plate is in a range of 8 MPa-14 MPa, a thickness of a glue layer formed by coating the glue on the surface of the back plate is in a range of 50 μm-150 μm, a contact area of the glue and the back plate accounts for 1%-98% of an area of an inner wall of the back plate, or the contact area of the glue and the back plate is in a range of 100-200 $mm^2$.

8. The speaker of claim 6, wherein a hole is provided on at least one of an interior or a surface of the first elastic element.

9. The speaker of claim 1, wherein the speaker comprises at least two resonance assemblies, in each of the at least two resonance assemblies, the first elastic element being connected to the back plate, two adjacent resonance assemblies of the at least two resonance assemblies being separated by a preset distance.

10. The speaker of claim 1, wherein the speaker comprises at least two resonance assemblies stacked along a thickness direction of first elastic elements in the at least two resonance assemblies, the first elastic element of one of two adjacent resonance assemblies of the at least two resonance assemblies being connected to a mass element of the other of the two adjacent resonance assemblies of the at least two resonance assemblies.

11. The speaker of claim 1, wherein the first elastic element comprises a diaphragm, and the mass element comprises a composite structure attached to a surface of the diaphragm.

12. The speaker of claim 11, wherein the vibration housing is provided with a sound outlet, a sound generated by a vibration of the resonance assembly being guided to outside through the sound outlet.

13. The speaker of claim 1, wherein the mass element is a groove member, the vibration element being at least partially accommodated in the groove member, the first elastic element being connected to an outer wall of the vibration housing and an inner wall of the groove member, a sound channel being formed between the inner wall of the groove member and the outer wall of the vibration housing.

14. The speaker of claim 1, wherein the speaker further comprises a function element connected to the mass element.

15. The speaker of claim 1, wherein the vibration assembly further comprises a second elastic element, the vibration element transmitting the mechanical vibration to the vibration housing through the second elastic element.

16. The speaker of claim 1, wherein the vibration housing forms a closed or non-closed accommodation space, and the vibration element is arranged inside the vibration housing.

* * * * *